US010285028B2

(12) United States Patent
Chincholi et al.

(10) Patent No.: US 10,285,028 B2
(45) Date of Patent: May 7, 2019

(54) ADAPTIVE RADIO LINK MONITORING

(71) Applicant: QUALCOMM Incorporated, San Diego, CA (US)

(72) Inventors: Amith Vikram Chincholi, Sunnyvale, CA (US); Parvathanathan Subrahmanya, Sunnyvale, CA (US); Valentin Alexandru Gheorghiu, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 111 days.

(21) Appl. No.: 15/423,524

(22) Filed: Feb. 2, 2017

(65) Prior Publication Data

US 2017/0230780 A1 Aug. 10, 2017

Related U.S. Application Data

(60) Provisional application No. 62/292,140, filed on Feb. 5, 2016.

(51) Int. Cl.
*H04W 4/70* (2018.01)
*H04W 24/08* (2009.01)
(Continued)

(52) U.S. Cl.
CPC ............ *H04W 4/70* (2018.02); *H04B 17/318* (2015.01); *H04B 17/336* (2015.01);
(Continued)

(58) Field of Classification Search
CPC ..... H04W 4/70; H04W 24/10; H04W 72/042; H04W 24/08; H04B 7/0413;
(Continued)

(56) References Cited

U.S. PATENT DOCUMENTS

2014/0098761 A1 4/2014 Lee et al.
2015/0271763 A1 9/2015 Balachandran et al.
2015/0334765 A1* 11/2015 Rahman ................ H04W 24/02
370/328

FOREIGN PATENT DOCUMENTS

WO WO-2015116870 A1 8/2015

OTHER PUBLICATIONS

International Search Report and Written Opinion—PCT/US2017/016417—ISA/EPO—dated May 12, 2017.
(Continued)

*Primary Examiner* — Afshawn M Towfighi
(74) *Attorney, Agent, or Firm* — Patterson & Sheridan, LLP

(57) ABSTRACT

Aspects of the present disclosure provide adaptive radio link monitoring for machine type communication(s) (MTC), enhanced MTC (eMTC), and/or narrowband Internet-of-Things (NB-IoT). In one aspect, a method is provided which may be performed by a user equipment (UE). The method generally includes receiving a first configuration of parameters for receiving downlink control channel signaling, the first configuration of parameters associated with a first coverage level; measuring at least one parameter related to channel conditions; determining one or more dynamic radio link monitoring (RLM) threshold values for the at least one parameter based, at least in part, on the first configuration of parameters; and performing RLM functions based on the one or more dynamic RLM threshold values. The threshold may comprise early out thresholds that occur before out-of-sync (OOS) or in-sync thresholds. The thresholds may be determined using lookup tables.

50 Claims, 17 Drawing Sheets

(51) Int. Cl.
  *H04W 72/04*   (2009.01)
  *H04L 5/14*    (2006.01)
  *H04L 5/16*    (2006.01)
  *H04B 17/318*  (2015.01)
  *H04B 17/336*  (2015.01)
  *H04L 29/08*   (2006.01)
  *H04L 12/26*   (2006.01)
  *H04W 24/10*   (2009.01)
  *H04L 1/00*    (2006.01)
  *H04L 5/00*    (2006.01)
  *H04B 7/0413*  (2017.01)

(52) U.S. Cl.
  CPC .......... *H04L 1/0046* (2013.01); *H04L 1/0067* (2013.01); *H04L 5/14* (2013.01); *H04L 5/16* (2013.01); *H04L 43/16* (2013.01); *H04L 67/34* (2013.01); *H04W 24/08* (2013.01); *H04W 24/10* (2013.01); *H04W 72/042* (2013.01); *H04B 7/0413* (2013.01); *H04L 5/0048* (2013.01); *H04L 67/12* (2013.01)

(58) Field of Classification Search
  CPC ... H04B 17/336; H04B 17/318; H04L 5/0048; H04L 1/0067; H04L 43/16; H04L 67/34; H04L 1/0046; H04L 5/16; H04L 5/14; H04L 67/12
  See application file for complete search history.

(56) References Cited

OTHER PUBLICATIONS

LG Electronics: "Measurements and Coverage Enhancement Level Configuration for MTC UEs", 3GPP TSG RAN WG1 Meeting #80, R1-150205, Feb. 8, 2015, XP050933419, Retrieved from the Internet: URL:http://www.3gpp.org/ftp/Meetings_3GPP_SYNC/RAN1/Docs/ [retrieved on Feb. 8, 2015], 5 pages.

* cited by examiner

ADAPTIVE RADIO LINK MONITORING

CROSS-REFERENCE TO RELATED APPLICATION & PRIORITY CLAIM

This application claims benefit of and priority to U.S. Provisional Patent Application Ser. No. 62/292,140, filed Feb. 5, 2016, which is herein incorporated by reference in its entirety for all applicable purposes.

BACKGROUND

Field of the Disclosure

Certain aspects of the present disclosure generally relate to wireless communications and, more particularly, to adaptive radio link monitoring (RLM) for machine type communication(s) (MTC), enhanced MTC (eMTC) and/or narrowband Internet-of-Things (NB-IoT).

Description of Related Art

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE)/LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices may include user equipments (UEs). Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Wireless devices may include narrowband Internet-of-Things (NB-IoT) devices. IoT may refer to a network of physical objects, devices, or "things". IoT devices may be embedded with, for example, electronics, software, or sensors and may have network connectivity, which enable these devices to collect and exchange data.

Some next generation, NR, or 5G networks may include a number of base stations, each simultaneously supporting communication for multiple communication devices, such as UEs. In LTE or LTE-A network, a set of one or more base stations may define an e NodeB (eNB). In other examples (e.g., in a next generation or 5G network), a wireless multiple access communication system may include a number of distributed units (e.g., edge units (EUs), edge nodes (ENs), radio heads (RHs), smart radio heads (SRHs), transmission reception points (TRPs), etc.) in communication with a number of central units (e.g., central nodes (CNs), access node controllers (ANCs), etc.), where a set of one or more distributed units, in communication with a central unit, may define an access node (e.g., a new radio base station (NR BS), a new radio node-B (NR NB), a network node, gNB, etc.). A base station or DU may communicate with a set of UEs on downlink channels (e.g., for transmissions from a base station or to a UE) and uplink channels (e.g., for transmissions from a UE to a base station or distributed unit).

Some next generation, NR, or 5G networks may support an uplink-based medium access control (MAC) layer. In these networks, a UE may transmit a pilot signal (e.g., a reference signal) for network access devices (e.g., distributed units) to receive and measure. Based on measurements of the pilot signal by one or more network access devices, the network may identify a serving cell (or serving distributed unit) for the UE. As the UE moves within the network, the network may make at least some mobility decisions for the UE (e.g., decisions to initiate a handover of the UE from one serving cell to another serving cell) transparently to the UE (e.g., without notifying the UE of the mobility decision, or without involving the UE in the mobility decision).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, MIMO antenna technology, and carrier aggregation.

However, as the demand for mobile broadband access continues to increase, there exists a need for further improvements in LTE, MTC, IoT, and NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "DETAILED DESCRIPTION" one will understand how the features of this disclosure provide advantages that include improved communications between access points and stations in a wireless network.

Certain aspects of the present disclosure generally relate to adaptive radio link monitoring (RLM) for machine type communication(s) (MTC), enhanced MTC, and/or narrowband Internet-of-Things (NB-IoT).

Certain aspects of the present disclosure provide a method, performed by a user equipment (UE). The method generally includes receiving a first configuration of parameters for receiving downlink control channel signaling, the first configuration of parameters associated with a first coverage level; measuring at least one parameter related to channel conditions; determining one or more dynamic RLM threshold values for the at least one parameter based, at least in part, on the first configuration of parameters; and performing RLM functions based on the one or more dynamic RLM threshold values.

Certain aspects of the present disclosure provide a method, performed by a base station (BS). The method generally includes sending a first configuration of parameters to a UE for receiving downlink control channel signaling, the first configuration of parameters associated with a first coverage level; receiving an indication, from the UE, of a change in a coverage zone; and sending, in response to receiving the indication, a second configuration of parameters to the UE for receiving downlink control channel signaling, the second configuration of parameters associated with a second coverage level.

Certain aspects of the present disclosure provide an apparatus (e.g., a UE). The apparatus generally includes means for receiving a first configuration of parameters for receiving downlink control channel signaling, the first configuration of parameters associated with a first coverage level; means for measuring at least one parameter related to channel conditions; means for determining one or more dynamic RLM threshold values for the at least one parameter based, at least in part, on the first configuration of parameters; and means for performing RLM functions based on the one or more dynamic RLM threshold values.

Certain aspects of the present disclosure provide an apparatus (e.g., a BS). The apparatus generally includes means for sending a first configuration of parameters to a UE for receiving downlink control channel signaling, the first configuration of parameters associated with a first coverage level; means for receiving an indication, from the UE, of a change in a coverage zone; and means for sending, in response to receiving the indication, a second configuration of parameters to the UE for receiving downlink control channel signaling, the second configuration of parameters associated with a second coverage level.

Certain aspects of the present disclosure provide an apparatus. The apparatus generally includes at least one processor configured to: receive a first configuration of parameters for receiving downlink control channel signaling, the first configuration of parameters associated with a first coverage level; measure at least one parameter related to channel conditions; determine one or more dynamic RLM threshold values for the at least one parameter based, at least in part, on the first configuration of parameters; and perform RLM functions based on the one or more dynamic RLM threshold values; and a memory coupled with the at least one processor.

Certain aspects of the present disclosure provide an apparatus. The apparatus generally includes at least one processor configured to: send a first configuration of parameters to a UE for receiving downlink control channel signaling, the first configuration of parameters associated with a first coverage level; receive an indication, from the UE, of a change in a coverage zone; and send, in response to receiving the indication, a second configuration of parameters to the UE for receiving downlink control channel signaling, the second configuration of parameters associated with a second coverage level.

Certain aspects of the present disclosure provide a computer readable medium having computer executable code stored thereon. The computer executable code generally includes code for receiving a first configuration of parameters for receiving downlink control channel signaling, the first configuration of parameters associated with a first coverage level; code for measuring at least one parameter related to channel conditions; code for determining one or more dynamic RLM threshold values for the at least one parameter based, at least in part, on the first configuration of parameters; and code for performing RLM functions based on the one or more dynamic RLM threshold values.

Certain aspects of the present disclosure provide a computer readable medium having computer executable code stored thereon. The computer executable code generally includes code for sending a first configuration of parameters to a UE for receiving downlink control channel signaling, the first configuration of parameters associated with a first coverage level; code for receiving an indication, from the UE, of a change in a coverage zone; and code for sending, in response to receiving the indication, a second configuration of parameters to the UE for receiving downlink control channel signaling, the second configuration of parameters associated with a second coverage level.

Numerous other aspects are provided including methods, apparatus, systems, computer program products, computer-readable medium, and processing systems. To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
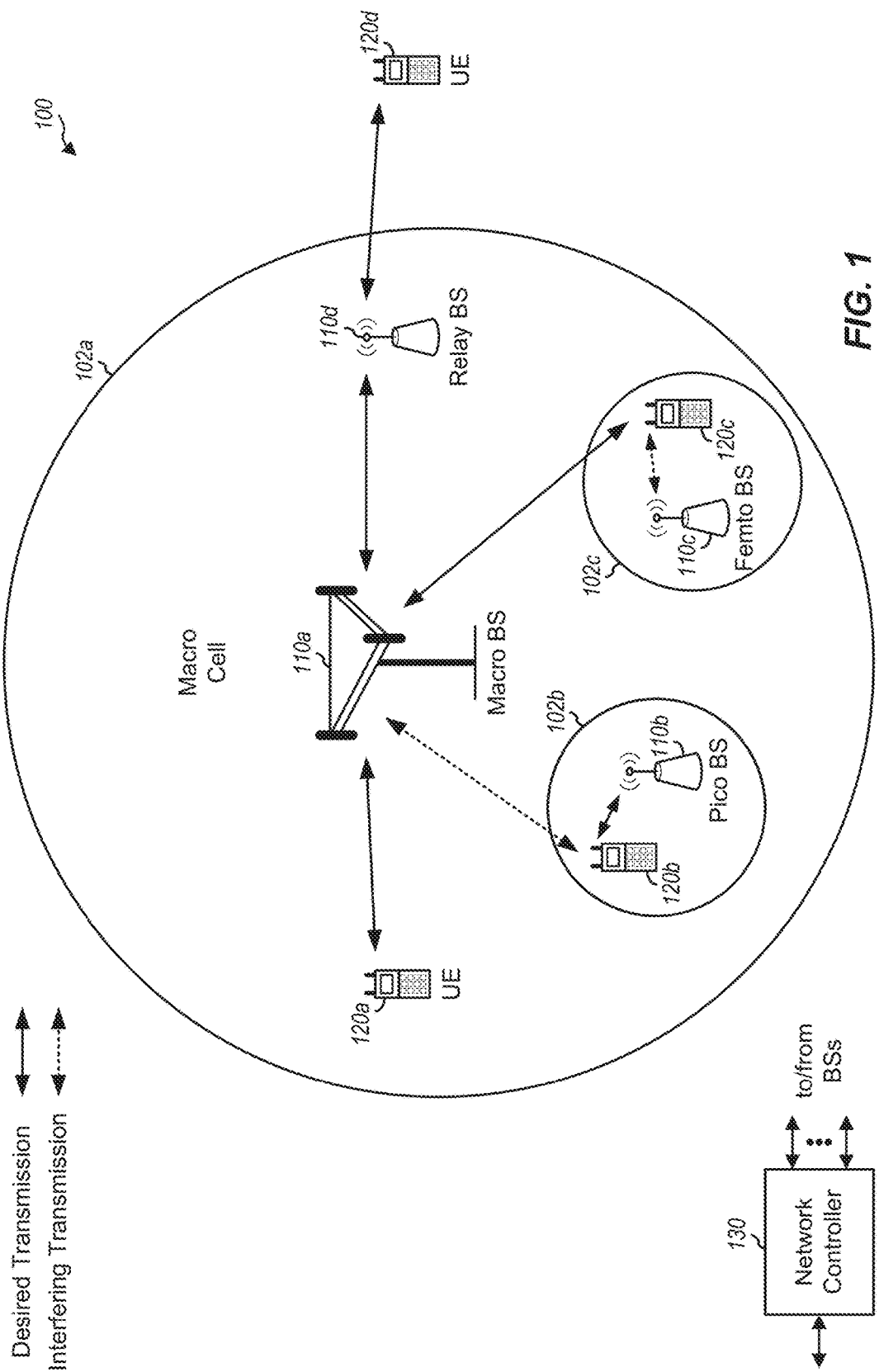
FIG. 1 is a block diagram conceptually illustrating an example of a wireless communication network, in accordance with certain aspects of the present disclosure.

Radio link monitoring (RLM) can be performed by a user equipment (UE) to detect the downlink radio quality. The UE monitors reference signals (e.g., cell-specific RS) and compares the measurements to reliability thresholds to determine whether the UE is out-of-service (OOS) or in-sync. Certain systems, such as enhanced machine type communications (eMTC) and/or narrowband Internet-of-Things (NB-IoT) systems transmit downlink control information (DCI) within a narrowband control channel. These systems may support mobility. As geometry changes, different configurations of the control channel can be used. If the reliability thresholds remain fixed for the different configurations, the UE could go OOS as it moves towards lower coverage regions and/or in-sync could be delayed as the UE moves back to higher coverage regions.

Aspects of the present disclosure provide adaptive (e.g., dynamic) radio link monitoring for MTC, eMTC, and/or NB-IoT. According to certain aspects, a UE may receive a first configuration of parameters for receiving downlink control channel signaling, the first configuration of parameters associated with a first coverage level; measure at least one parameter related to channel conditions; determine one or more dynamic RLM threshold values based, at least in part, on the first configuration of parameters; and perform RLM functions based on the one or more dynamic RLM threshold values. The thresholds values can be determined based on sets of lookup tables (LUTs) stored at the UE corresponding to different configurations of the parameters. In addition, event triggers can be defined for the UE to request a new configuration early, before the thresholds have been satisfied.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000. IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UNITS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP), cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below. LTE and LTE-A are referred to generally as LTE. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications Network

FIG. 1 illustrates an example wireless communication network 100, in which aspects of the present disclosure may be practiced. For example, techniques presented herein may be used to dynamically determine radio link monitoring (RLM) threshold values for machine type communication(s) (MTC), enhanced MTC (eMTC), and/or narrowband Internet-of-Things (NB-IoT). In aspects, a user equipment (UE) 120 can receive (e.g., from BS 110) a first configuration of parameters for receiving downlink control channel signaling (e.g., a MTC physical downlink control channel (MPDCCH)), the first configuration of parameters associated with a first coverage level. The UE 120 can measure at least one parameter related to channel conditions, determine one or more dynamic RLM threshold values (e.g., $Q_{in}/Q_{out}$ threshold values) for the at least one parameter based, at least in part, on the first configuration of parameters, and perform RLM functions based on the one or more dynamic RLM threshold values.

The network 100 may be an LTE network or some other wireless network. Wireless communication network 100 may include a number of BSs 110 and other network entities. A BS is an entity that communicates with user equipments (UEs) and may also be referred to as a e Node B (eNB), a Node B, an access point, a 5G NB, gNB, transmission reception point (TRP), a new radio (NR) BS, etc. Each BS may provide communication coverage for a particular geographic area. In 3GPP, the term "cell" can refer to a coverage area of an BS and/or an BS subsystem serving this coverage area, depending on the context in which the term is used.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station" and "cell" may be used interchangeably herein.

Wireless communication network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless communication network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless communication network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another. e.g., directly or indirectly via a wireless or wireline backhaul.

UEs 120 (e.g., 120a, 120b, 120c) may be dispersed throughout wireless communication network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, etc. In FIG. 1, a solid line with double arrows indicates desired transmissions between a UE and a serving BS, which is an eNB designated to serve the UE on the downlink and/or uplink. A dashed line with double arrows indicates potentially interfering transmissions between a UE and an BS.

Figure 2:
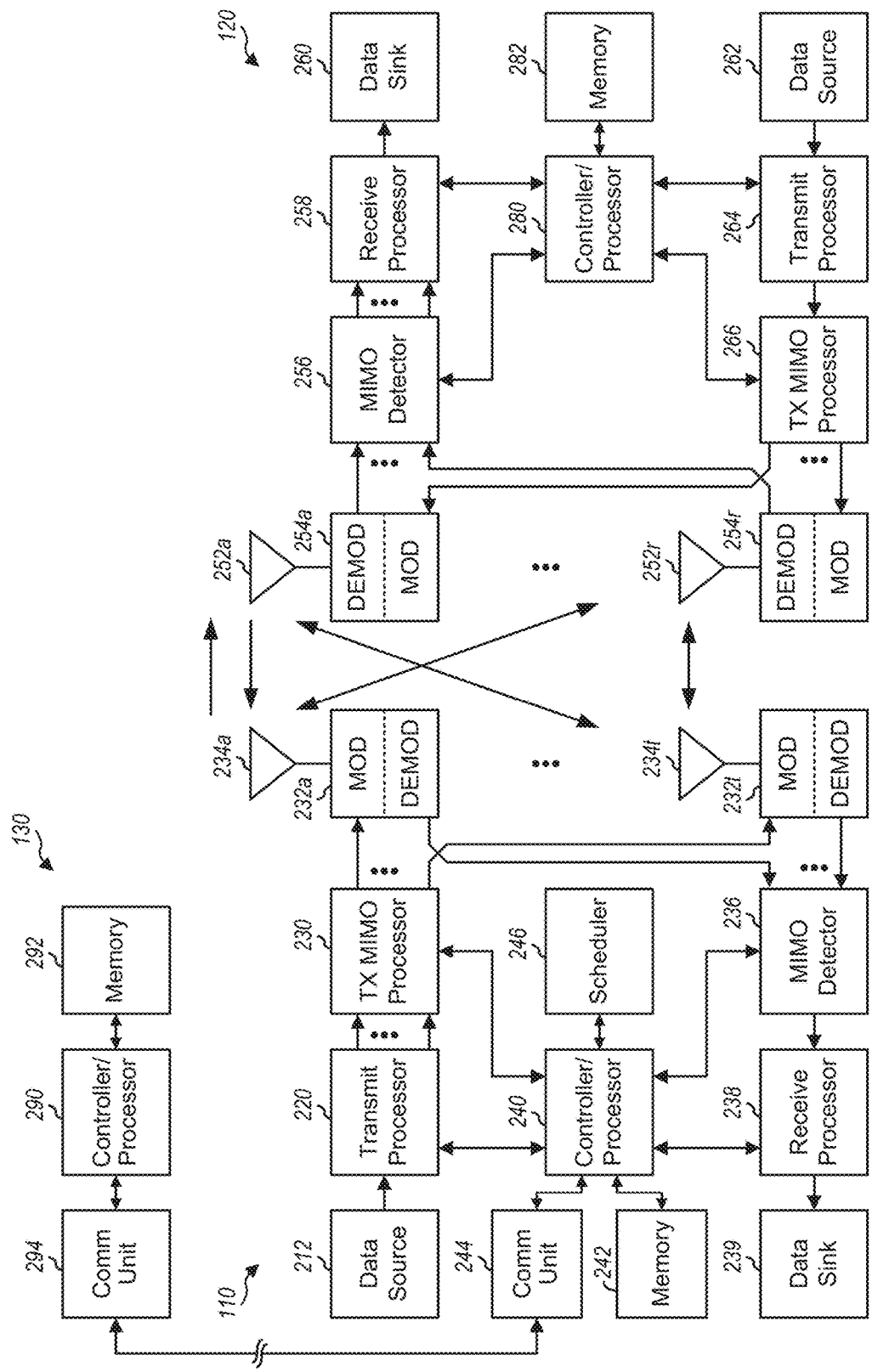
FIG. 2 shows a block diagram conceptually illustrating an example of a base station (BS) in communication with a user equipment (UE) in a wireless communications network, in accordance with certain aspects of the present disclosure.

FIG. 2 shows a block diagram of a design of BS 110 and UE 120, which may be one of the base stations/eNBs and one of the UEs in FIG. 1. BS 110 may be equipped with T antennas 234a through 234t, and UE 120 may be equipped with R antennas 252a through 252r, where in general T 1 and R 1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively, to perform techniques presented herein for HARQ timing for HARQ ID determination for eMTC to use for communications between a UE (e.g., an eMTC UE or NB-IoT device) and a base station (e.g., an eNodeB, TRP, AP, NB, 5G NB, NR BS, gNB, etc.). For example, processor 240 and/or other processors and modules at base station 110, and processor 280 and/or other processors and modules at UE 120, may perform or direct operations of base station 110 and UE 120, respectively. For example, controller/processor 280 and/or other controllers/processors and modules at UE 120, and/or controller/processor 240 and/or other controllers/processors and modules at BS 110 may perform or direct operations 1100 and 1400 shown in FIGS. 11 and 14, respectively. Memories 242 and 282 may store data and program codes for base station 110 and UE 120, respectively. A scheduler 246 may schedule UEs for data transmission on the downlink and/or uplink.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

Figure 3:
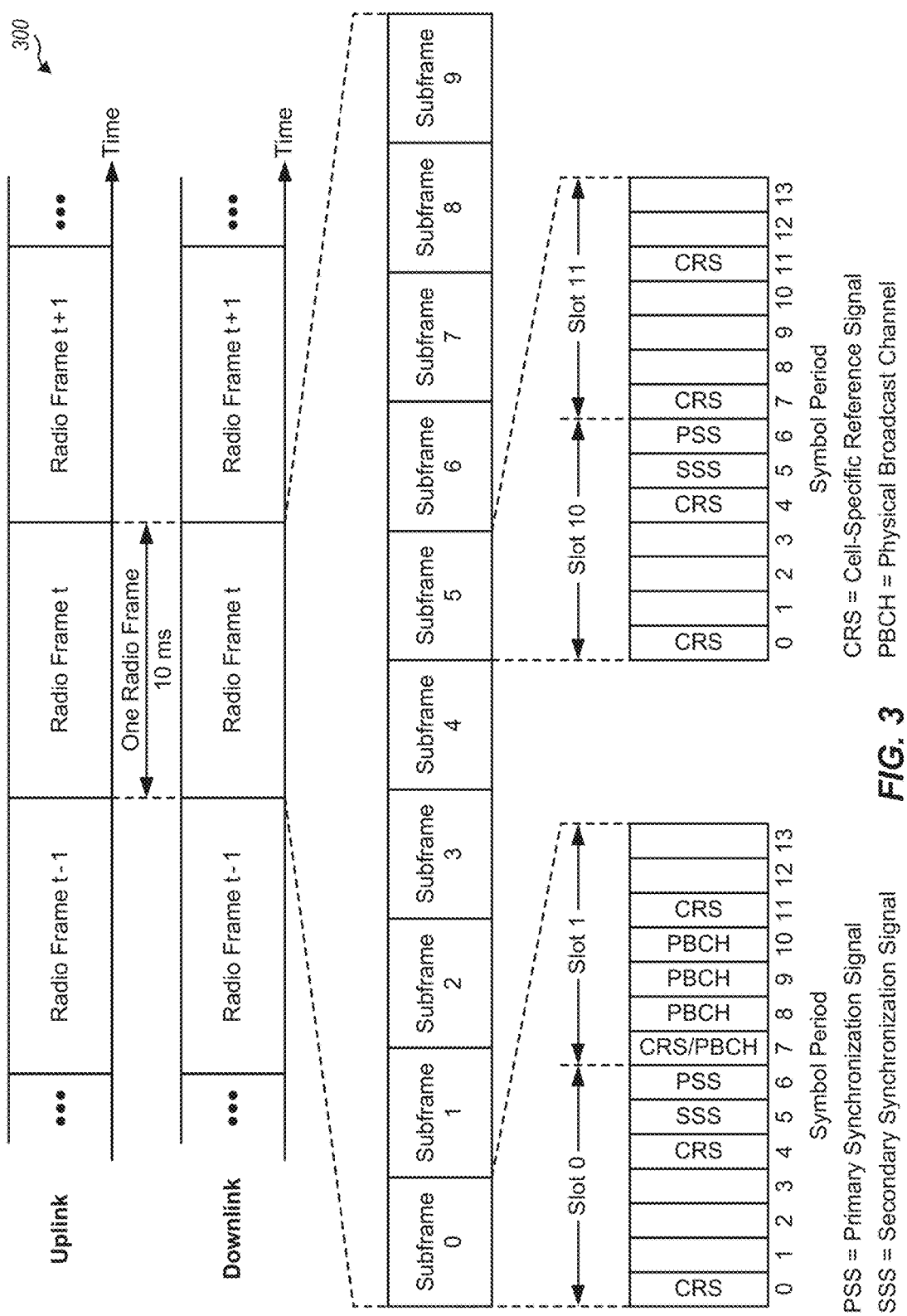
FIG. 3 is a block diagram conceptually illustrating an example of a frame structure in a wireless communications network, in accordance with certain aspects of the present disclosure.

FIG. 3 shows an exemplary frame structure 300 for FDD in a wireless communication system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

In certain wireless communication systems (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In certain systems (e.g., such as NR or 5G systems), a BS may transmit these or other signals in these locations or in different locations of the subframe.

Figure 4:
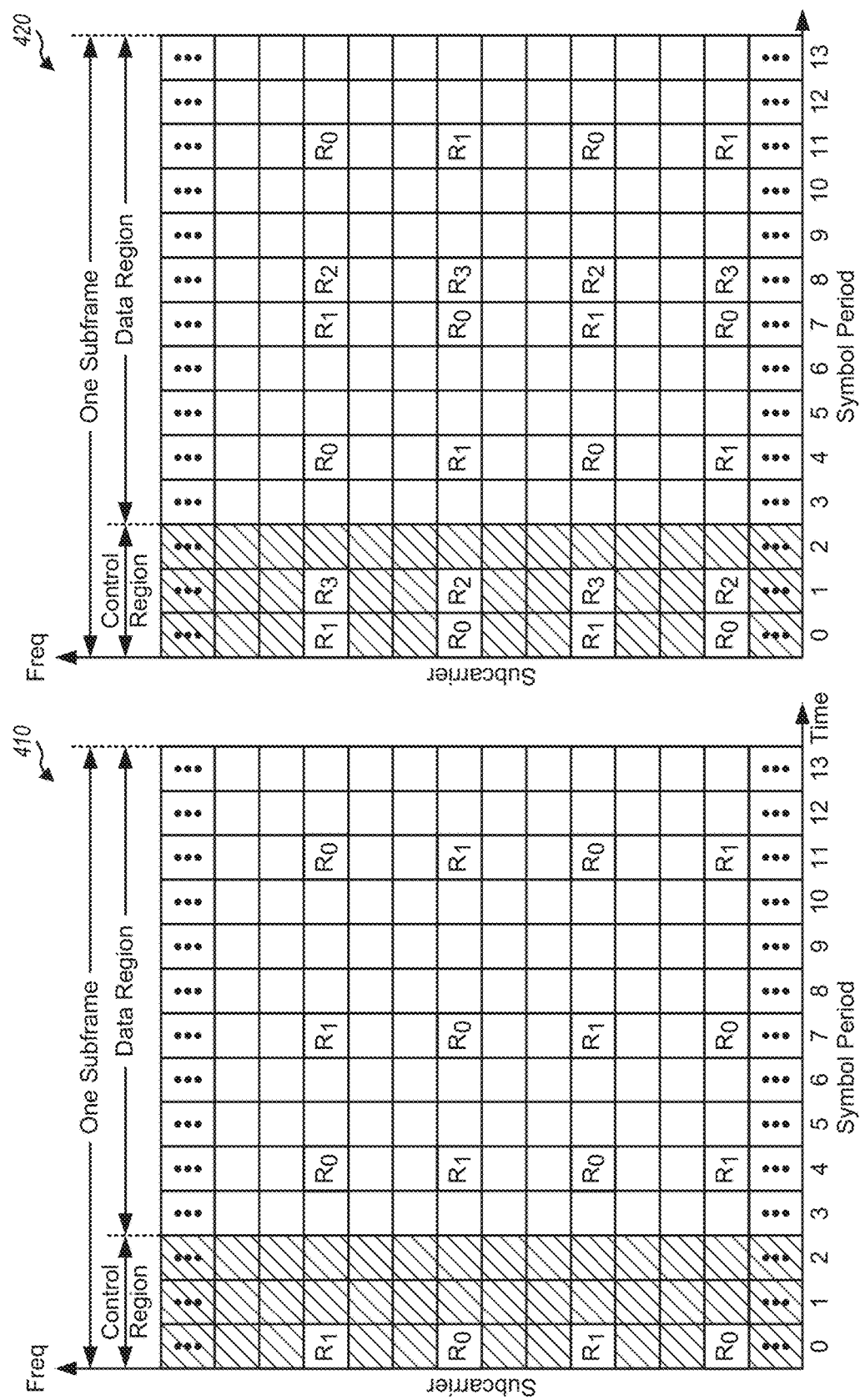
FIG. 4 is a block diagram conceptually illustrating two exemplary subframe formats with the normal cyclic prefix, in accordance with certain aspects of the present disclosure.

FIG. 4 shows two exemplary subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q−1}.

The wireless network may support hybrid automatic retransmission request (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

Example eMTC

The focus of traditional LTE design (e.g., for legacy "non MTC" devices) is on the improvement of spectral efficiency, ubiquitous coverage, and enhanced quality of service (QoS) support. Current LTE system downlink (DL) and uplink (UL) link budgets are designed for coverage of high end devices, such as state-of-the-art smartphones and tablets, which may support a relatively large DL and UL link budget.

However, low cost, low rate devices need to be supported as well. For example, certain standards (e.g., LTE Release 12) have introduced a new type of UE (referred to as a category 0 UE) generally targeting low cost designs or machine type communications. For machine type communications (MTC), various requirements may be relaxed as only a limited amount of information may need to be exchanged. For example, maximum bandwidth may be reduced (relative to legacy UEs), a single receive radio frequency (RF) chain may be used, peak data rate may be reduced (e.g., a maximum of 1000 bits for a transport block size), transmit power may be reduced, Rank 1 transmission may be used, and half duplex operation may be performed.

In some cases, if half-duplex operation is performed, MTC UEs may have a relaxed switching time to transition from transmitting to receiving (or receiving to transmitting). For example, the switching time may be relaxed from 20 μs for regular UEs to 1 ms for MTC UEs. Release 12 MTC UEs may still monitor downlink (DL) control channels in the same way as regular UEs, for example, monitoring for wideband control channels in the first few symbols (e.g., PDCCH) as well as narrowband control channels occupying a relatively narrowband, but spanning a length of a subframe (e.g., enhanced PDCCH or ePDCCH).

Certain standards (e.g., LTE Release 13) may introduce support for various additional MTC enhancements, referred to herein as enhanced MTC (or eMTC). For example, eMTC may provide MTC UEs with coverage enhancements up to 15 dB.

Figure 5:
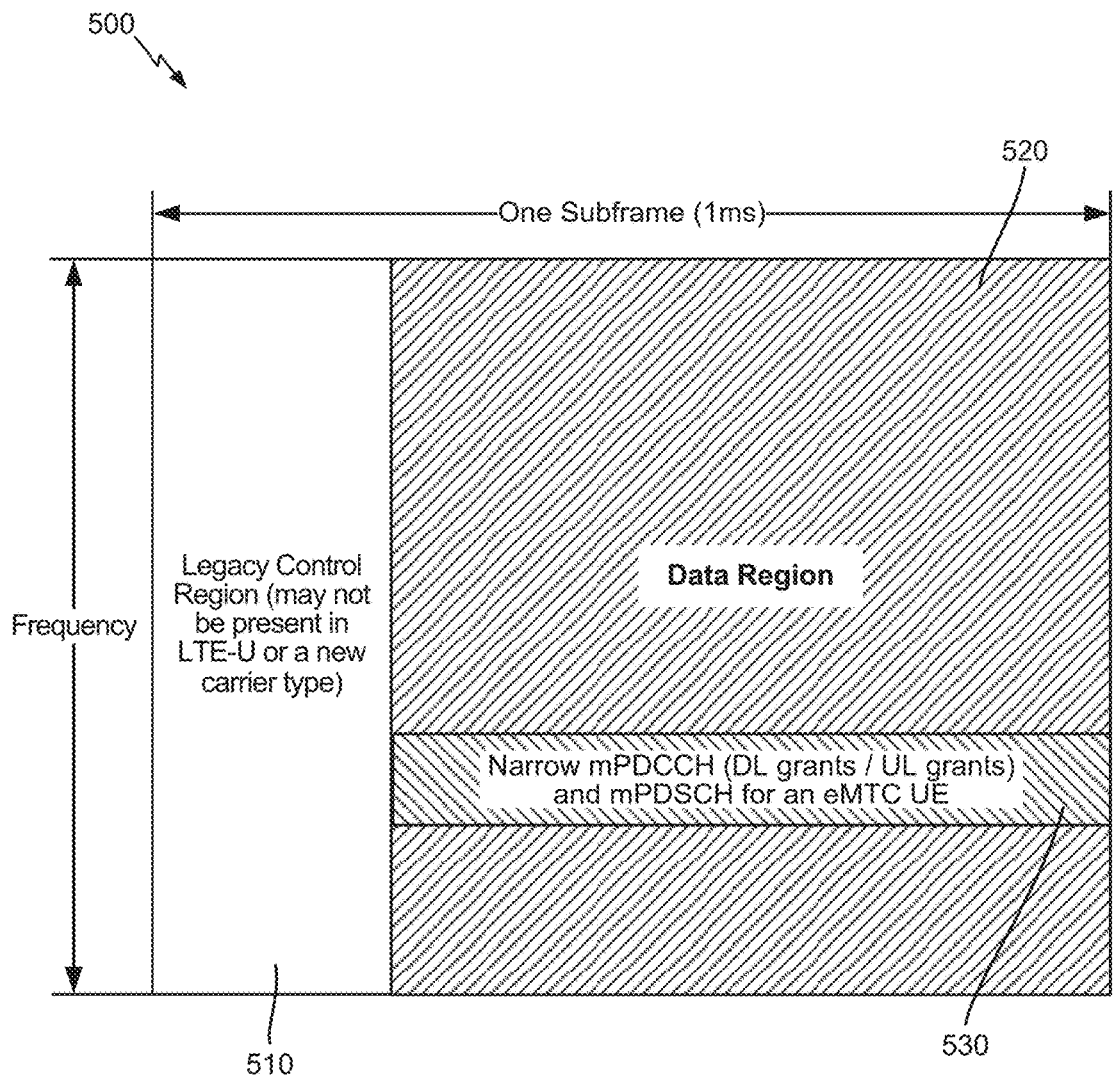
FIG. 5 illustrates an exemplary subframe configuration for enhanced machine type communications (eMTC), in accordance with certain aspects of the present disclosure.

As illustrated in the subframe structure 500 of FIG. 5, eMTC UEs can support narrowband operation while operating in a wider system bandwidth (e.g., 1.4/3/5/10/15/20 MHz). In the example illustrated in FIG. 5, a conventional legacy control region 510 may span system bandwidth of a first few symbols, while a narrowband region 530 of the system bandwidth (spanning a narrow portion of a data region 520) may be reserved for an MTC physical downlink control channel (referred to herein as an M-PDCCH) and for an MTC physical downlink shared channel (referred to herein as an M-PDSCH). In some cases, an MTC UE monitoring the narrowband region may operate at 1.4 MHz or 6 resource blocks (RBs).

However, as noted above, eMTC UEs may be able to operate in a cell with a bandwidth larger than 6 RBs. Within this larger bandwidth, each eMTC UE may still operate (e.g., monitor/receive/transmit) while abiding by a 6-physical resource block (PRB) constraint. In some cases, different eMTC UEs may be served by different narrowband regions (e.g., with each spanning 6-PRB blocks). As the system bandwidth may span from 1.4 to 20 MHz, or from 6 to 100 RBs, multiple narrowband regions may exist within the larger bandwidth. An eMTC UE may also switch or hop between multiple narrowband regions in order to reduce interference.

Example Narrowband Internet-of-Things (NB-IoT)

The Internet-of-Things (IoT) may refer to a network of physical objects, devices, or "things". IoT devices may be embedded with, for example, electronics, software, or sensors and may have network connectivity, which enable these devices to collect and exchange data. IoT devices may be sensed and controlled remotely across existing network infrastructure, creating opportunities for more direct integration between the physical world and computer-based systems and resulting in improved efficiency, accuracy, and economic benefit. Systems that include IoT devices augmented with sensors and actuators may be referred to cyber-physical systems. Cyber-physical systems may include technologies such as smart grids, smart homes, intelligent transportation, and/or smart cities. Each "thing" (e.g., IoT device) may be uniquely identifiable through its embedded computing system may be able to interoperate within existing infrastructure, such as Internet infrastructure.

Narrowband IoT (NB-IoT) may refer to a narrowband radio technology specially designed for the IoT. NB-IoT may focus on indoor coverage, low cost, long battery life, and large number of devices. To reduce the complexity of UEs, NB-IoT may allow for narrowband deployments utilizing one physical resource block (PRB) (e.g., 180 kHz+20 kHz guard band). NB-IoT deployments may utilize higher layer components of certain systems (e.g., LTE) and hardware to allow for reduced fragmentation and cross compatibility with, for example, NB-LTE and/or enhanced/evolved machine type communications (eMTC).

Figure 6:
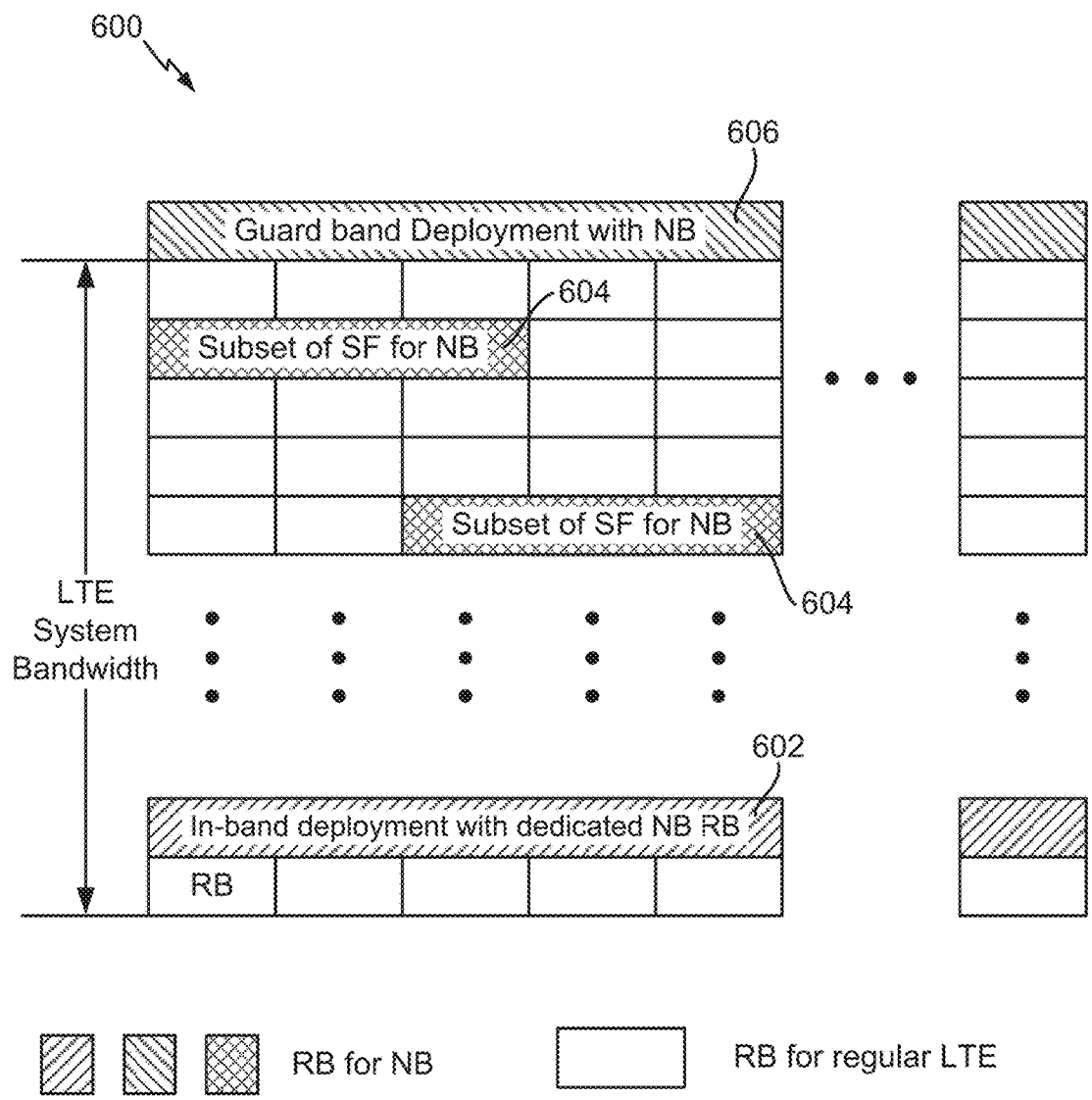
FIG. 6 illustrates an example deployment of narrowband Internet-of-Things (NB-IoT), in accordance with certain aspects of the present disclosure.

FIG. 6 illustrates an example deployment 600 of NB-IoT, according to certain aspects of the present disclosure. Three NB-IoT deployment configurations include in-band, guard-band, and standalone. For the in-band deployment configuration, NB-IoT may coexist with a legacy system (e.g., GSM, WCDMA, and/or LTE system(s)) deployed in the same frequency band. For example, the wideband LTE channel may be deployed in various bandwidths between 1.4 MHz to 20 MHz. As shown in FIG. 6, a dedicated resource block (RB) 602 within that bandwidth may be available for use by NB-IoT and/or the RBs 1204 may be dynamically allocated for NB-IoT. As shown in FIG. 6, in an in-band deployment, one RB, or 200 kHz, of a wideband channel (e.g., LTE) may be used for NB-IoT.

Certain systems (e.g., LTE) may include unused portions of the radio spectrum between carriers to guard against interference between adjacent carriers. In some deployments, NB-IoT may be deployed in a guard band 606 of the wideband channel.

In other deployments, NB-IoT may be deployed standalone (not shown). In a standalone deployment, one 200 MHz carrier may be utilized to carry NB-IoT traffic and GSM spectrum may be reused.

Deployments of NB-IoT may include synchronization signals such as PSS for frequency and timing synchronization and SSS to convey system information. For NB-IoT operations. PSS/SSS timing boundaries may be extended as compared to the existing PSS/SSS frame boundaries in legacy systems (e.g., LTE), for example, from 10 ms to 40 ms. Based on the timing boundary, a UE is able to receive a PBCH transmission, which may be transmitted in subframe 0 of a radio frame.

Example NR/5G RAN Architecture

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a CP on the uplink and downlink and include support for half-duplex operation using TDD. NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 9 and 10.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units The RAN may include a central unit (CU) and distributed units (DUs). A NR BS (e.g., gNB, 5G Node B. Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 7:
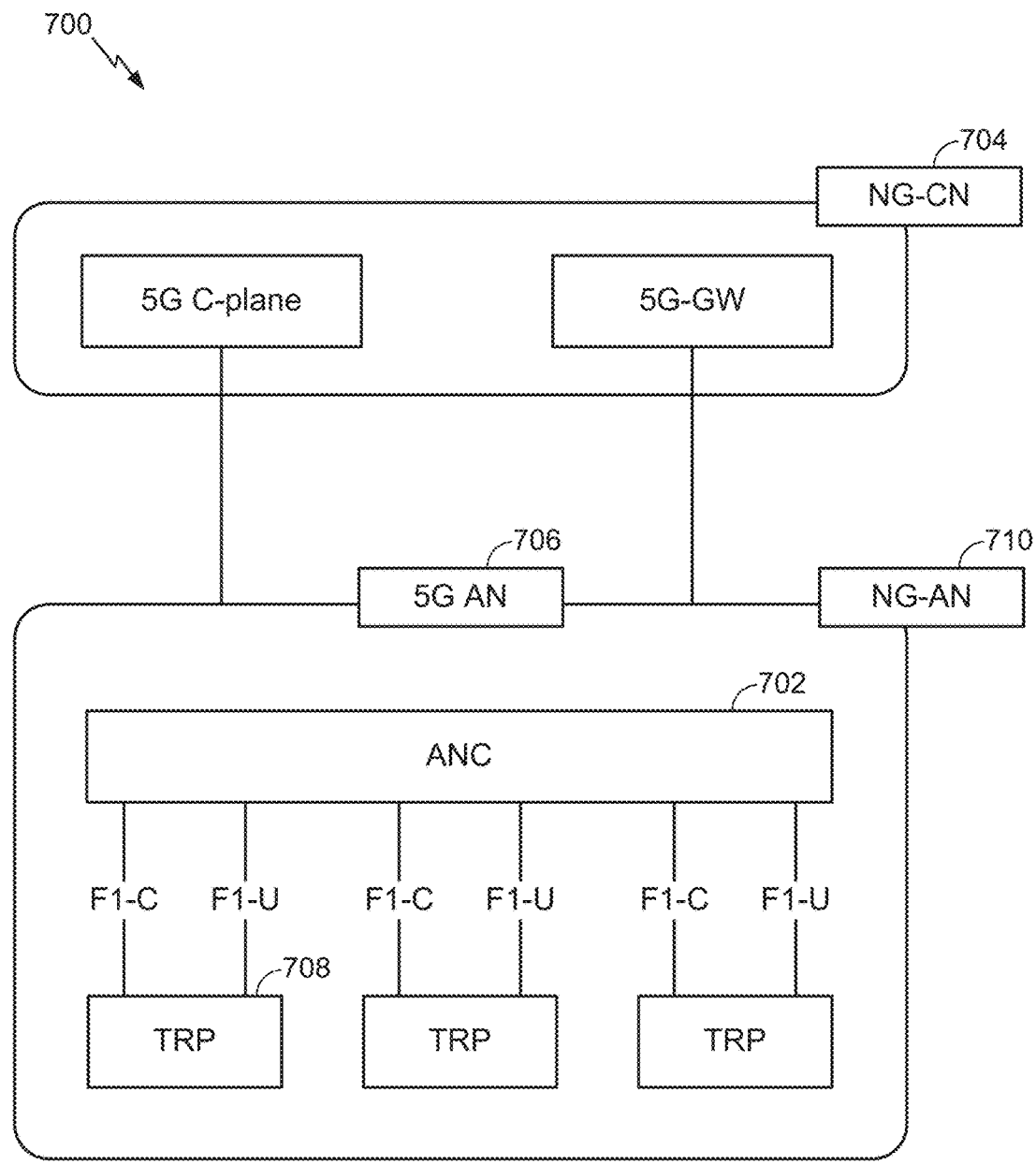
FIG. 7 illustrates an example logical architecture of a distributed radio access network (RAN), in accordance with certain aspects of the present disclosure.

FIG. 7 illustrates an example logical architecture of a distributed RAN 700, according to aspects of the present disclosure. A 5G access node 706 may include an access node controller (ANC) 702. The ANC may be a central unit (CU) of the distributed RAN 700. The backhaul interface to the next generation core network (NG-CN) 704 may terminate at the ANC. The backhaul interface to neighboring next generation access nodes (NG-ANs) may terminate at the ANC. The ANC may include one or more TRPs 708 (which may also be referred to as BSs, NR BSs, Node Bs, 5G NBs, APs, or some other term). As described above, a TRP may be used interchangeably with "cell."

The TRPs 708 may be a distributed unit (DU). The TRPs may be connected to one ANC (ANC 702) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 700 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 710 may support dual connectivity with NR. The NG-AN may share a common fronthaul for LTE and NR.

The architecture may enable cooperation between and among TRPs 708. For example, cooperation may be preset within a TRP and/or across TRPs via the ANC 702. According to aspects, no inter-TRP interface may be needed/present.

According to aspects, a dynamic configuration of split logical functions may be present within the architecture 700. The PDCP, RLC, MAC protocol may be adaptably placed at the ANC or TRP.

According to certain aspects, a BS may include a central unit (CU) (e.g., ANC 702) and/or one or more distributed units (e.g., one or more TRPs 708).

Figure 8:
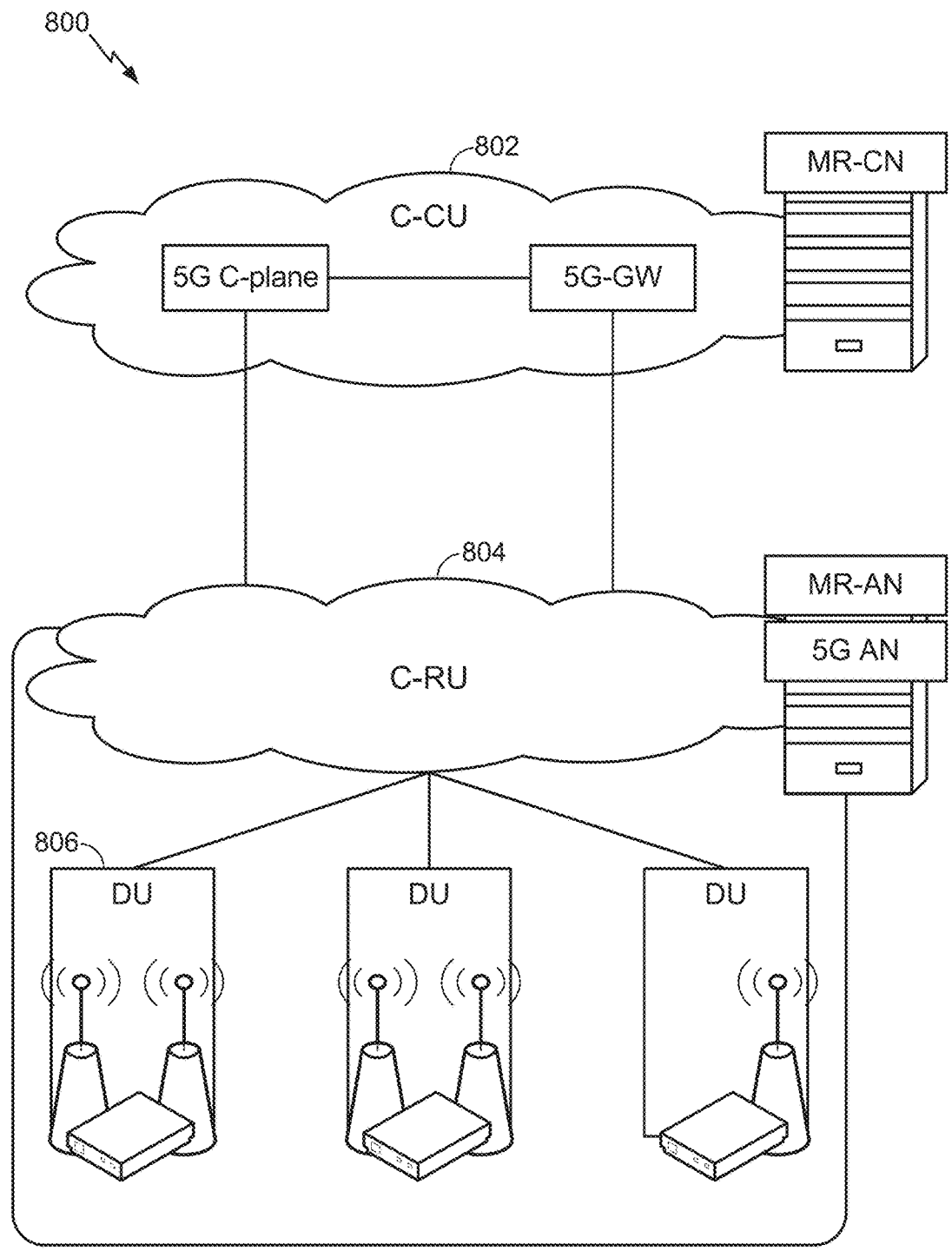
FIG. 8 illustrates an example physical architecture of a distributed RAN, in accordance with certain aspects of the present disclosure.

FIG. 8 illustrates an example physical architecture of a distributed RAN 800, according to aspects of the present disclosure. A centralized core network unit (C-CU) 802 may host core network functions. The C-CU may be centrally deployed. C-CU functionality may be offloaded (e.g., to advanced wireless services (AWS)), in an effort to handle peak capacity.

A centralized RAN unit (C-RU) 804 may host one or more ANC functions. Optionally, the C-RU may host core network functions locally. The C-RU may have distributed deployment. The C-RU may be closer to the network edge.

A distributed unit (DU) 706 may host one or more TRPs. The DU may be located at edges of the network with radio frequency (RF) functionality.

Figure 9:
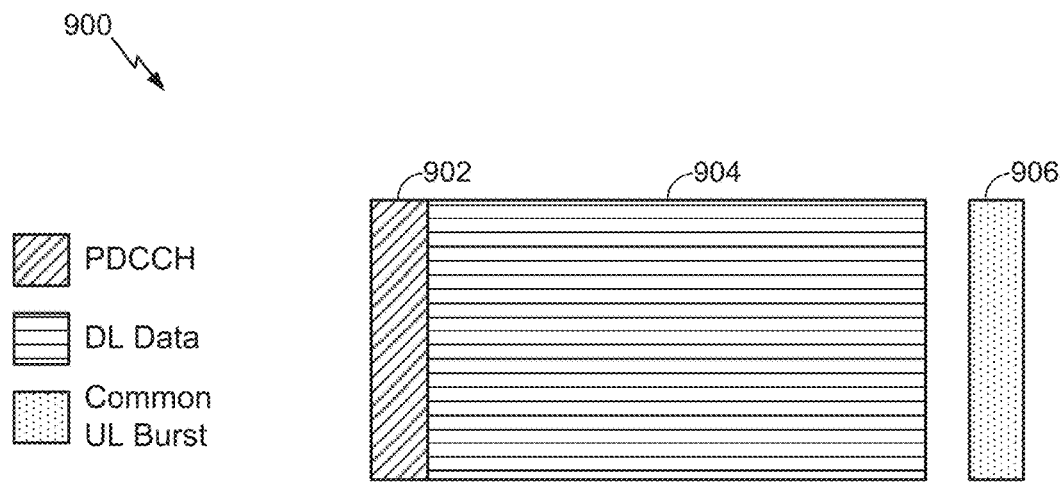
FIG. 9 is a diagram illustrating an example of a downlink (DL)-centric subframe, in accordance with certain aspects of the present disclosure.

FIG. 9 is a diagram 900 showing an example of a DL-centric subframe. The DL-centric subframe may include a control portion 902. The control portion 902 may exist in the initial or beginning portion of the DL-centric subframe. The control portion 902 may include various scheduling information and/or control information corresponding to various portions of the DL-centric subframe. In some configurations, the control portion 902 may be a physical DL control channel (PDCCH), as indicated in FIG. 9. The DL-centric subframe may also include a DL data portion 904. The DL data portion 904 may sometimes be referred to as the payload of the DL-centric subframe. The DL data portion 904 may include the communication resources utilized to communicate DL data from the scheduling entity (e.g., UE or BS) to the subordinate entity (e.g., UE). In some configurations, the DL data portion 904 may be a physical DL shared channel (PDSCH).

The DL-centric subframe may also include a common UL portion 906. The common UL portion 906 may sometimes be referred to as an UL burst, a common UL burst, and/or various other suitable terms. The common UL portion 906 may include feedback information corresponding to various other portions of the DL-centric subframe. For example, the common UL portion 906 may include feedback information corresponding to the control portion 902. Non-limiting examples of feedback information may include an ACK signal, a NACK signal, a HARQ indicator, and/or various other suitable types of information. The common UL portion 906 may include additional or alternative information, such as information pertaining to random access channel (RACH) procedures, scheduling requests (SRs), and various other suitable types of information. As illustrated in FIG. 9, the end of the DL data portion 904 may be separated in time from the beginning of the common UL portion 906. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 10:
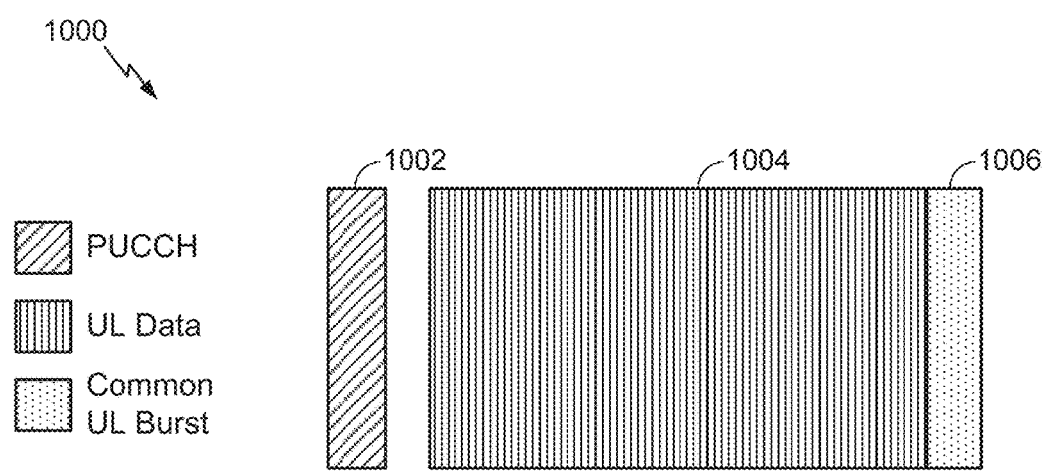
FIG. 10 is a diagram illustrating an example of an uplink (UL)-centric subframe, in accordance with certain aspects of the present disclosure.

FIG. 10 is a diagram 1000 showing an example of an UL-centric subframe. The UL-centric subframe may include a control portion 1002. The control portion 1002 may exist in the initial or beginning portion of the UL-centric subframe. The control portion 1002 in FIG. 10 may be similar to the control portion 1002 described above with reference to FIG. 9. The UL-centric subframe may also include an UL data portion 1004. The UL data portion 1004 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 1002 may be a physical uplink control channel (PUCCH). In some configurations, the data portion may be a physical uplink shared channel (PUSCH).

As illustrated in FIG. 10, the end of the control portion 1002 may be separated in time from the beginning of the UL data portion 1004. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 1006. The common UL portion 1006 in FIG. 10 may be similar to the common UL portion 1006 described above with reference to FIG. 10. The common UL portion 1006 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an access node (AN), or a distributed unit (DU), or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a central unit (CU) to which receiving network access device(s) transmit the measurements of the pilot signals, may use the measurements to identify serving cells for the UEs, or to initiate a change of serving cell for one or more of the UEs.

Example Adaptive Radio Link Monitoring

Techniques discussed herein may be applied to, for example, but not limited to, machine type communications (MTC), enhanced MTC (eMTC), and/or narrowband internet-of-things (NB-IoT) for adaptive radio link monitoring (RLM) and early event triggers.

As discussed above, in certain systems, system bandwidth may be divided into narrowband subbands. Each narrowband subband may be six (6) resource blocks (RBs). A user equipment (UE) (e.g., such as UE 120 which may be a MTC UE, cMTC UE, or IoT device) may transmit and receive in one narrowband each subframe. In some cases, bundling (e.g., repetitions) can be used for channels. In one mode of operation, referred to herein as coverage enhancement (CE) Mode A, no repetitions or few repetitions may be used. In another mode of operation, CE Mode B, a large number of repetitions may be used.

The UE may perform RLM. The UE monitors the downlink quality based on cell-specific reference signals (CRS) in order to detect the downlink radio link quality. In certain system, such as NB-IoT, the UE monitors the downlink quality based on narrowband reference signals (NRS). The UE can compare the downlink radio link quality to RLM thresholds, $Q_{out}$ and $Q_{in}$. $Q_{out}$ corresponds to the threshold at which the downlink radio link cannot be reliably relieved (e.g., 10% physical downlink control channel (PDCCH) block error rate (BLER)). If the downlink radio link signal quality falls below the $Q_{out}$ threshold, the UE may be considered in an out-of-synchronization (OOS) state. In this case, the UE starts a timer (e.g., a T310 timer) upon receiving consecutive (e.g., N410) OOS indications for the cell (e.g., the primary cell (PCell)). $Q_{in}$ corresponds to the threshold at which the downlink radio link can be significantly more reliably received than at $Q_{out}$ (e.g., 2% PDCCH BLER). If the downlink radio link signal quality exceeds the $Q_{in}$ threshold, the UE may be considered in a synchronized state. In this case, the UE stops the timer (e.g., the T310 timer) upon receiving consecutive (e.g., N311) in-sync indications for the cell (e.g., the PCell).

In eMTC, an MTC physical downlink control channel (M-PDCCH) can be used to transmit downlink control information (DCI) messages to the MTC UEs within a narrowband control channel. The BS (e.g., such as BS 110) may configure the MTC UE with various parameters for receiving the MPDCCH (e.g., MPDCCH configuration). For example, the BS can configure different aggregation/repetition levels, transmission mode, and a physical resource block (PRB) sets for MPDCCH. The configuration can be different for each UE. Different MPDCCH configurations may provide a different BLER performance depending on the geometry. Also, TxD mode (e.g., number of Tx antennas) used by the BS can also impact BLER performance.

In certain systems, $Q_{out}$ and $Q_{in}$ threshold values are fixed for certain aggregation levels, in order to ensure that that the $Q_{out}$ and $Q_{in}$ thresholds correspond to a particular signal reliability, such as 2% and 10% PDCCH BLER, respectively. In eMTC, certain UEs (e.g., such as eMTC Category 1 UEs) may support mobility. As geometry changes, the BS may configure different aggregation/repetition levels for MPDCCH for the MTC UE-since the BLER performance of the MPDCCH configuration changes with respect to geometry, as discussed above.

If the $Q_{out}$ and $Q_{in}$ threshold values are fixed, then downlink signal quality for a MTC UE moving towards lower coverage regions could drop below $Q_{out}$ and UE enters an OOS state, which may lead to radio link failure (RLF) and the UE may need to perform a random access channel (RACH) procedure to reacquire the system. This could lead to unnecessary latency and power consumption. Similarly, if the MTC UE moves to better coverage regions, the MTC UE could be delayed in entered a synchronization state, for example, until the UE enters a coverage region where the MPCCH configuration provides 2% and 10% PDCCH BLER performance. Therefore, different corresponding $Q_{out}$ and $Q_{in}$ threshold values associated with each MPDCCH configuration may be desirable.

Further, even if the UE maintains different $Q_{out}$ and $Q_{in}$ threshold values for each MPDCCH configuration, criteria and mechanisms to pre-emptively switch threshold settings are desirable. For example, if the MTC UE measures a downlink radio link signal quality that corresponds to, for example, 9% MPDCCH BLER, the downlink radio link signal quality may soon drop below $Q_{out}$ (e.g., a $Q_{out}$ that corresponds to 10% MPDCCH BLER) if the UE continues to move to worse coverage without any change in the MPDCCH configuration. If that happens, the UE may enter the OOS state and the UE transmitter may shut down. Also, the BS may not be aware of the MTC UE's speed/direction of travel/positioning and, thus, may not be able to autonomously pre-emptively change the MPDCCH configuration to provide the UE with a reliable link quality during coverage level transitions.

In aspects, these considerations may also apply to the narrowband PDCCH (e.g., NPDCCH) in NB-IoT. For example, a narrowband category UE may monitor downlink quality (e.g., signal-to-noise ratio (SNR)), based on a narrowband reference signal and compare it to the thresholds $Q_{out}$ and $Q_{in}$. NB-IoT can support mobility in connected mode and support different coverage levels as in eMTC.

Accordingly, techniques for adaptive RLM thresholds and early event triggers to obtain new configurations/coverage levels for coverage zone transitions are desirable. These techniques may be applied to, for example, but not limited to, MTC, eMTC, and/or NB-IoT for adaptive (e.g., dynamic) RLM and early event triggers.

For example, aspects provide for signaling by the UE (e.g., in the connected mode) to the BS to pre-emptively change the control channel repetition level (and corresponding control channel configuration parameters) to provide the UE with a reliable link quality during coverage level transmission during UE mobility, for example, without increasing UE power consumption.

Figure 11:
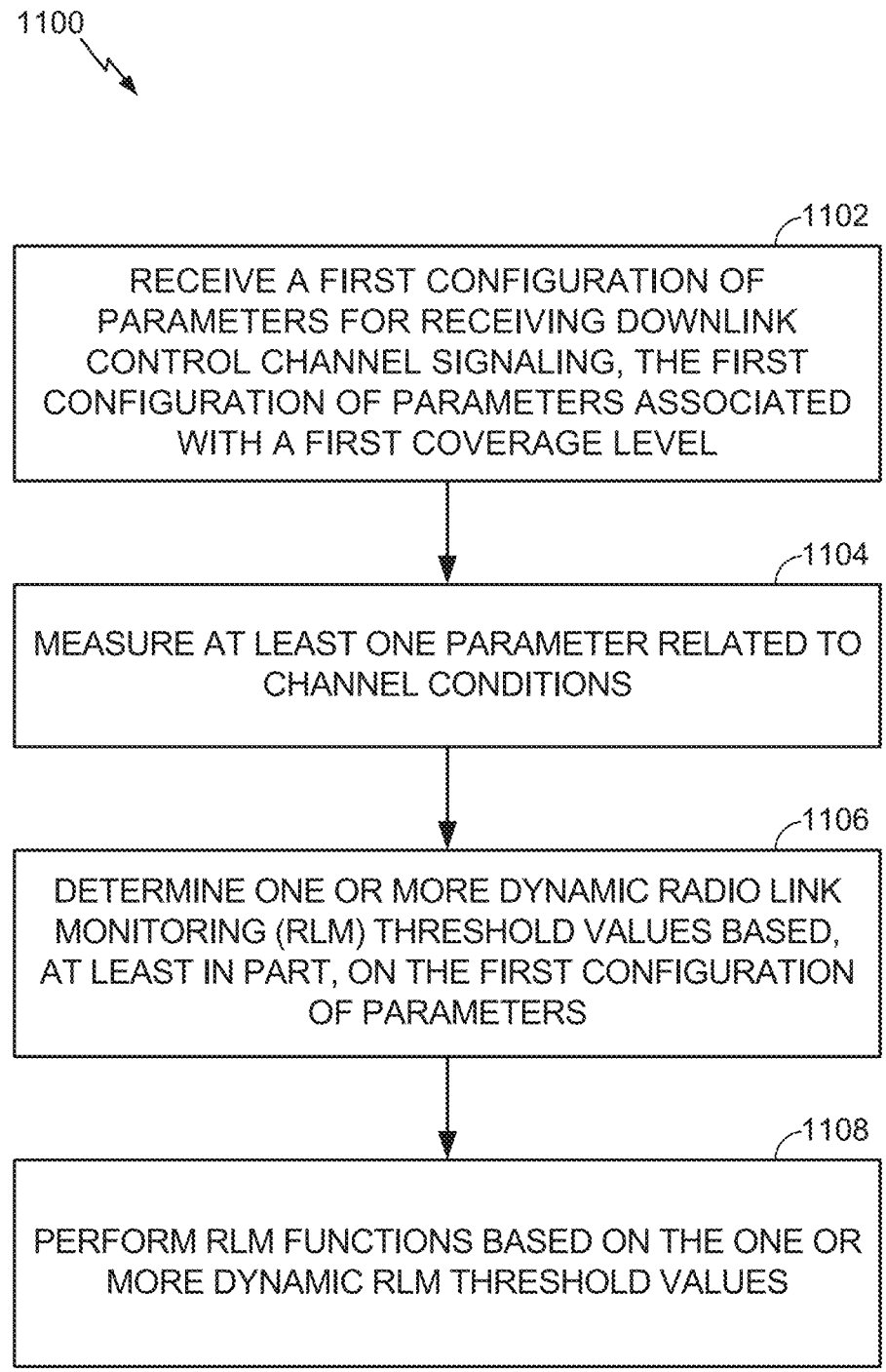
FIG. 11 is a flow diagram illustrating example operations for wireless communications by a UE for dynamic radio link monitoring (RLM), in accordance with certain aspects of the present disclosure.

FIG. 11 is a flow diagram illustrating example operations 1100 for adaptive RLM, in accordance with certain aspects of the present disclosure. The operations 1100 may be performed, for example, by a UE (e.g., UE 120) such as an (e)MTC UE or NB-IoT device. The operations 1100 may begin, at 1102, by receiving a first configuration of parameters for receiving downlink control channel signaling (e.g., an MPDCCH or NPDCCH configuration), the first configuration of parameters associated with a first coverage level. At 1104, the UE measures at least one parameter related to channel conditions. At 1106, the UE determines (e.g., based on a lookup table) one or more dynamic RLM threshold values (e.g., $Q_{in}$, $Q_{out}$, Early_$Q_{in}$, and/or Early_$Q_{out}$) for the at least one parameter based, at least in part, on the first configuration of parameters. At 1108, the UE performs RLM functions based on the one or more dynamic RLM threshold values. For example, the UE can send an indication of change in a coverage zone if one of the thresholds is satisfied in order to obtain a second configuration associated with a second coverage level.

The UE may report coverage level change to the network as a measurement report or a predefined measurement event, so that the network can use the appropriate repetition level for the control channel and ensure reliable radio link quality.

Example Adaptive RLM Thresholds

According to certain aspects, the UE (e.g., MTC UE and/or IoT device) may maintain different RLM thresholds for different control channel configurations (e.g., MPDCCH or NPDCCH). As the UE moves across (e.g., transitions between) coverage regions, the UE can adjust (e.g., adapt dynamically) the RLM thresholds based on parameters of the current control channel configuration and measures parameters related to the channel condition and geometry. For example, the parameters configured by the BS may include aggregation level, repetition level, transmission mode (TM), and/or number of physical resource blocks (PRBs) in PRB resource set. Parameters measured by the UE may include channel impulse response (CIR), delay spread (Extended Vehicular A model (EVA), Extended Pedestrian A model (EPA), Extended Urban model (ETU)), UE speed, Doppler, reference signal received power (RSRP), reference signal received quality (RSRQ), Signal to Interference plus noise ratio (SINR), number of receive antennas at the UE, number of transmit antennas at the BS, rank of the channel between the UE and the BS, taking into account discontinuous reception (DRX)/eDRX cycle length/duty cycle to account for measurement accuracy, a deployment mode (e.g., in-band, guard-band, or standalone) of the cell, and/or whether half-duplex frequency division duplexing (FDD) or time division duplexing (TDD) mode of communications is configured.

According to certain aspects, the UE may maintain (e.g., store) lookup tables (LUTs) containing RLM threshold values associated with the different BS configured parameters and UE measured parameters. For example, for each control channel configuration (e.g., each combination of aggregation level, repetition level, transmission mode, and number of PRBs parameters), the UE may maintain (e.g., store) multiple sets of LUTs associated with (e.g., mapping) that control channel configuration. For each control channel configuration, the multiple stored sets of LUTs may include a set (e.g., a subset) of LUTs corresponding to different coverage zones, for example, based on whether the RSRP/RSRQ/SINR measurement falls within a particular range. For example, range L1≤RSRP/RSRQ/SINR<range L2 may correspond to a first coverage zone (e.g., coverage zone 1) and range L2≤RSRP/RSRQ/SINR<range L3 may correspond to a second coverage zone (e.g., coverage zone 2), etc. The LUTs may be of size m×n having m bins/rows for UE speed/Doppler and n bins/columns for delay spread. Each element in the 2-dimensional LUT stores $Q_{out}$ and $Q_{in}$ threshold values for the speed and delay spread pair associated with that element.

According to certain aspects, an error/measurement bias value (e.g., a correction value) can be applied to the RLM threshold values. An additional LUT may be used to store the bias values based on RSRP/RSRQ/SINR measurement, DRX cycle length/duty cycle, frequency error and timing error.

Example New Event Triggers

According to certain aspects, different RLM thresholds (measurement events) referred to as Early_$Q_{in}$ and Early_$Q_{out}$ a can be defined. These measurement events may be defined to preemptively indicate to the network (e.g., the BS) about a coverage zone change to ensure early triggering of a control channel configuration change by the BS, even before the UE moves across coverage zones and, for example, before satisfying a $Q_{out}$ or $Q_{in}$ threshold value. The measurement events may also be associated with a hysteresis (e.g., a hysteresis timer) to prevent toggling between control channel configurations.

According to certain aspects, the measurement events (e.g., the Early_$Q_{in}$ and Early_$Q_{out}$ threshold values) can be communicated by the network to the UE. Alternatively, the measurement events may be chosen by the UE (e.g., selected), for example, based on a target BLER (e.g., a target control channel BLER). In aspects, Early_$Q_{out}$ can be chosen by the UE such that it corresponds to x % BLER where x is chosen as a function of channel impulse response, a delay spread, UE speed, a Doppler value, number of receive antennas at UE, number of transmit antennas at the BS, rank of the channel between the BS and UE, RSRP, RSRQ. SINR, taking into account the measurement accuracy due to DRX/cDRX cycle length or duty cycle, and whether half-duplex (HD) FDD or TDD mode of communication is configured.

According to certain aspects, the preemptive indication to the network of the coverage zone change may be an explicit indication to the network of the coverage zone change. Alternatively, the UE can provide one or more measurement values (e.g., −90 dBm) to the BS, from which the BS can determine the potential coverage zone change.

Figure 12:
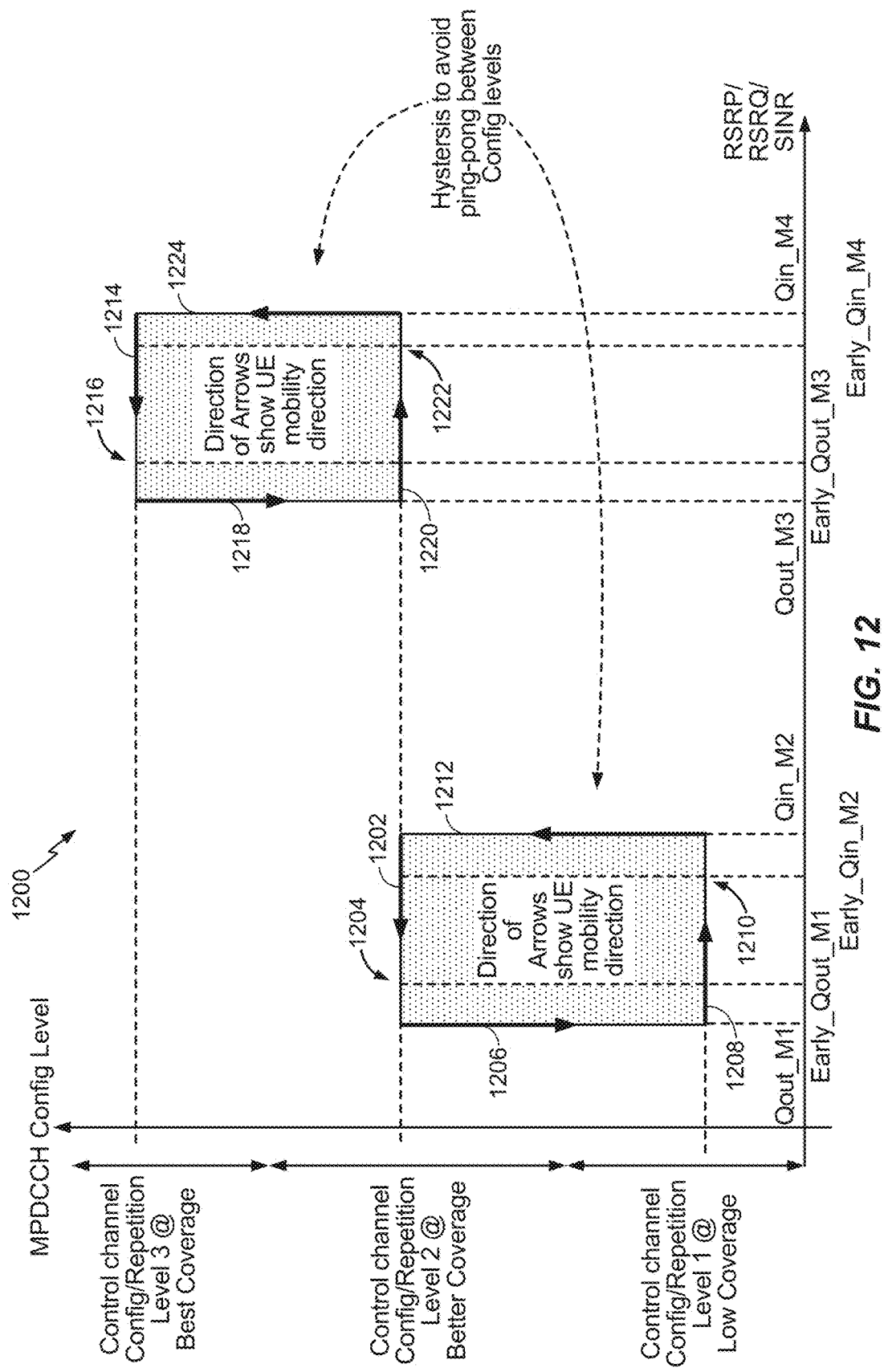
FIG. 12 is a discrete graph illustrating example event thresholds and hysteresis for early out event triggers, in accordance with certain aspects of the present disclosure.

FIG. 12 is a discrete graph 1200 illustrating example event thresholds and hysteresis for early out event triggers, in accordance with certain aspects of the present disclosure. As shown in FIG. 12, the UE may maintain different RLM thresholds associated with different coverage levels for different control channel configurations. For example, as shown in FIG. 12, for control channel configuration Level 2, the UE maintains the $Q_{out}$_M3 threshold value 1218 and the $Q_{in}$_M3 threshold value 1224 and has measurement events Early_$Q_{in}$_M4 1222 and Early_$Q_{out}$_M3 1216. Thus, as the UE moves to better coverage (e.g., better RSRP/RSRQ/SINR measurements) at 1220, once the UE satisfies the Early_$Q_{in}$_M4 1222, the UE can be send an indication to the BS and can receive the control channel configuration Level 3. At 1214, if the UE moves to worse coverage, once the UE satisfies the Early_$Q_{out}$_M3 1216, the UE can send an indication to the BS of the coverage zone change and receive control channel configuration Level 2. Similarly, as shown in FIG. 12, the UE may switch between control channel configurations Level 1 and 2 based on the Early_$Q_{out}$_M1 1204 and Early_$Q_{in}$_M2 1210.

Figure 13:
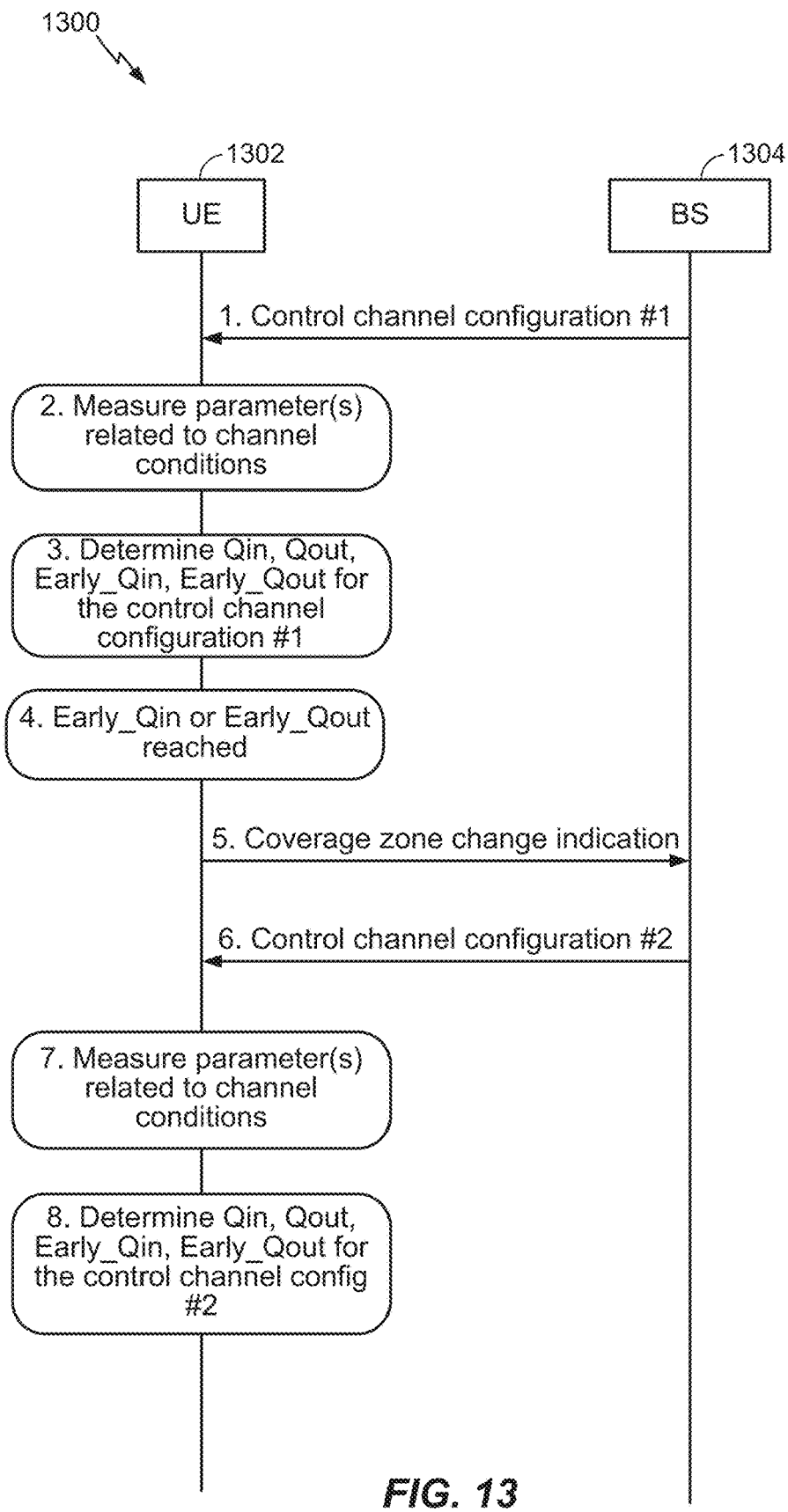
FIG. 13 is an example call flow diagram illustrating example operations for dynamic RLM, in accordance with certain aspects of the present disclosure.

FIG. 13 is an example call flow 1300 diagram illustrating example operations for adaptive RLM for MTC, eMTC, and/or NB-IoT, in accordance with certain aspects of the present disclosure. The call flow 1300 may illustrate signaling between the UE 1302 and BS 1304 corresponding to the events in the graph 1200. As shown in FIG. 13, at 1, the UE 1302 receives control channel configuration #1 (e.g., such as control channel Level 2 illustrated in FIG. 12) from the BS 1304. At 2, the UE measures parameter(s) related to channel conditions and, at 3, determines the RLM threshold values and measurement events associated with the configuration (e.g., $Q_{out}$_M3 threshold value 1318, $Q_{in}$_M3 threshold value 1324, and measurement events Early_$Q_4$_M4 1322 and Early_$Q_{out}$_M3 1316 illustrated in FIG. 12). At 4, the UE 1302 may satisfy one of the measurement events (e.g., moving into a better coverage region 1314 until Early_$Q_{in}$_M4 1322 or a worse coverage region 1320 until Early_$Q_{out}$_M3 1316). At 5, the UE 1302 may send the coverage zone change indication to the BS 1304 and, at 6, receive the control channel configuration #2 (e.g., control channel configuration Level 1 or Level 3). At 7, the UE 1302 measures the parameter(s) related to channel condition and, at 8, determines the RLM threshold values and measurement events associated with the new current MPDCCH configuration #2.

Figure 14:
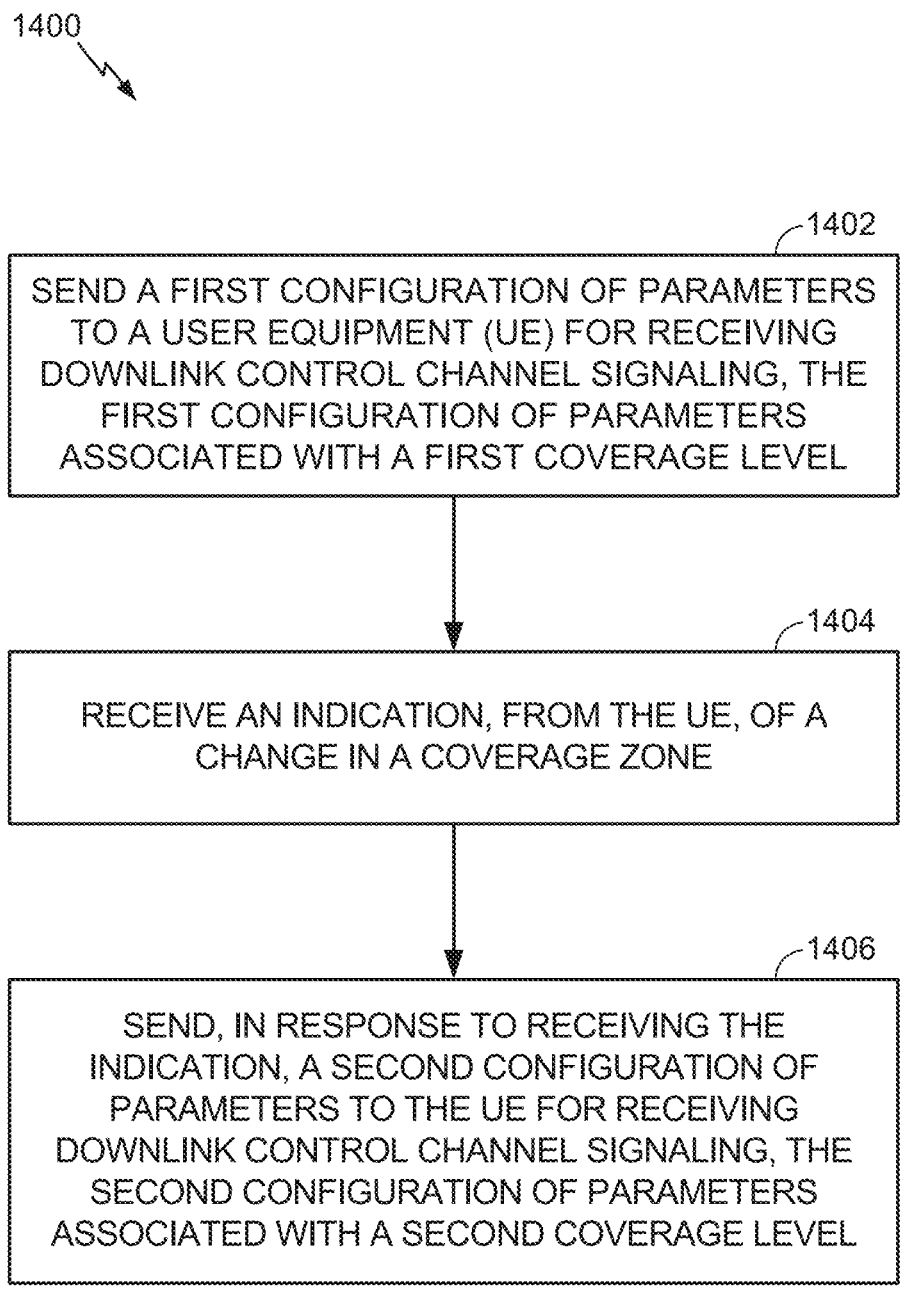
FIG. 14 is a flow diagram illustrating example operations for wireless communications by a base station (BS) for dynamic RLM, in accordance with certain aspects of the present disclosure.

FIG. 14 is a flow diagram illustrating example operations 1400 for wireless communications, in accordance with certain aspects of the present disclosure. The operations 1400 may comprise complementary operations performed by the BS (e.g., such as BS 110) to the operations 1400 performed by the UE. The operations 1400 may begin, at 1402, by sending a first configuration of parameters to a UE for receiving downlink control channel signaling, the first configuration of parameters associated with a first coverage level. At 1404, the BS receives an indication, from the UE, of a change in a coverage zone. At 1406, the BS sends, in response to receiving the indication, a second configuration of parameters to the UE for receiving downlink control channel signaling, the second configuration of parameters associated with a second coverage level.

According to certain aspects, the UE may report a number of repetitions of the control channel that the UE used for decoding the control channel. Alternatively, the UE may report a difference between a number of repetitions of the control channel that the UE used for decoding the control channel and the number of configured repetitions of the control channel (e.g., based on the configuration associated with the coverage level).

Example SNR Versus BLER Mapping

According to certain aspects, SNR (signal-to-noise ratio) values may be mapped to BLERs (block error rates) based different control channel configurations. For example, the UE maintain different SNR to BLER lookup tables (LUTs) for different NPDCCH (or MPDCCH) configurations, repetition levels, UE Doppler, transmission mode, etc. The corresponding BLER for an SNR value may then be compared to a reliability threshold, for example, whether the BLER is less than 2% (e.g., $Q_{in}$) or greater than 10% (e.g., $Q_{out}$).

The UE maintains multiple LUTs based on the BS configured parameters and UE measurement metrics. For each repetition level, UE Doppler, and transmission mode, the UE may maintain multiple look-up tables. Each LUT may have m bins/rows (e.g., number of SNR bins) and each LUT may have two columns-one column for SNR and the other column for BLER.

According to certain aspects, the SNR used as the RLM SNR metric and mapped to BLER may be the demodulation front end SNR. In certain systems (e.g., LTE), the RLM SNR is calculated on a per subframe basis and averaged over an evaluation period ($T_{eval}$) and mapped to a hypothetical BLER based on stored values of SNR to BLER mapping. In this case, the BLER per subframe can be averaged and compared against the 2% and 10% BLER thresholds. However, in some cases (e.g., NB1), SNR may not be estimated per subframe, for example, due to a low density of reference signal tones. Thus, the UE may estimate SNR as a long term average using a dynamically selected infinite impulse response (IIR) filter coefficient $\alpha$. $\alpha$ may be the non-coherence IIR filter coefficient used to filter signal power and noise power for SNR estimation. The filter length $N_{avg}$ may be given by:

$$N_{avg} = 2*(1/\alpha)$$

When UE enters a connected mode, the SNR estimate may be sampled every $N_{avg}$ and averaged over $T_{eval}$. The window length $T_{eval}$ may be based on a configured values. The number of BLER estimated to average may be given by:

$$\text{Number of } BLER \text{ estimates to average} = \max\left(\left\lfloor \frac{Teval}{Navg} \right\rfloor, 1\right)$$

Taking the maximum may ensure that at least one SNR estimate is selected in an evaluation period if $N_{avg}$ is longer than $T_{eval}$.

For non-DRX (discontinuous reception), different $T_{eval}$ durations may be used. When DRX is configured, $T_{eval}$ may specified as a number of DRX cycles to be used. In this case, the number of BLER estimates to average may be computed as:

$$\text{Number of } BLER \text{ estimates to average} = \max\left(\left\lfloor \frac{drxCyleON * NumDRX}{Navg} \right\rfloor, 1\right)$$

Figure 15:
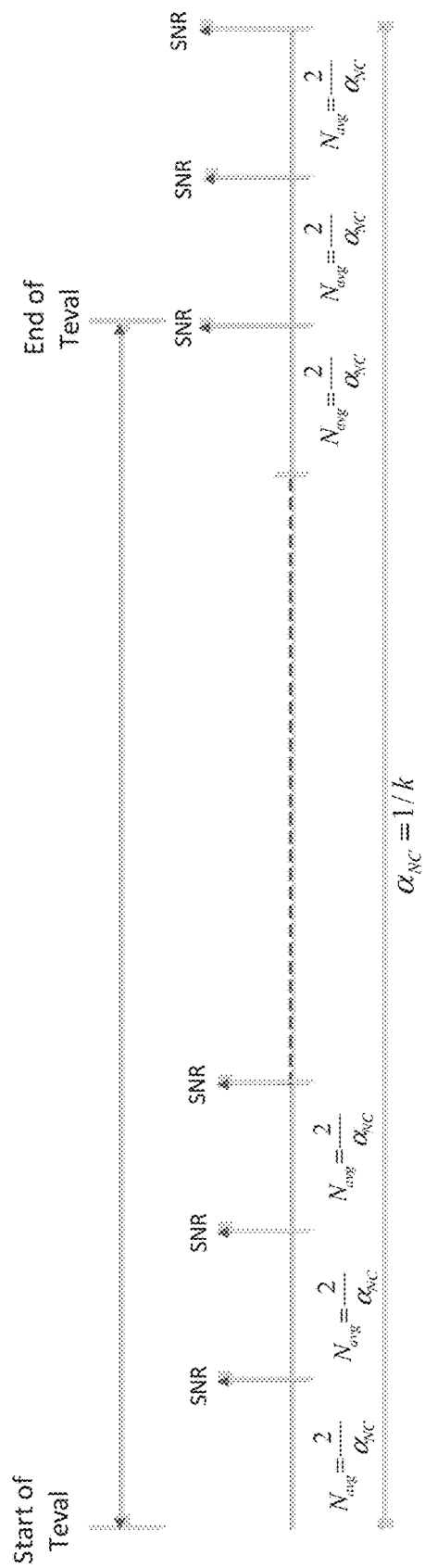
FIG. 15 is an example timeline of a signal-to-noise ratio (SNR) evaluation period without change in filtering coefficient, in accordance with certain aspects of the present disclosure.
Figure 16:
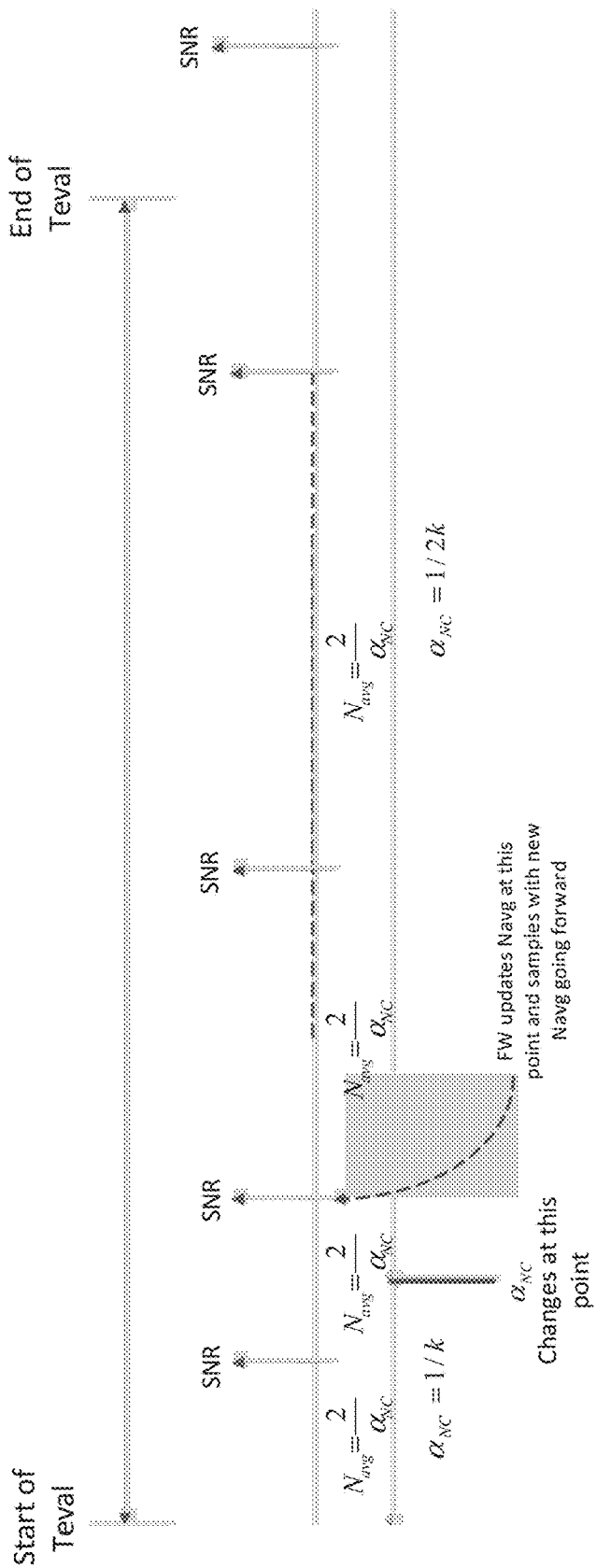
FIG. 16 is an example timeline of an SNR evaluation period with changes in filtering coefficient, in accordance with certain aspects of the present disclosure.

If there is no change in $\alpha$ during the evaluation period, then the final average SNR value may be reported at the end of $T_{eval}$, for example, as shown in FIG. 15. Since $\alpha$ may change during the evaluation period, $\alpha$ may be checked at the start of each $N_{avg}$ period and the SNR may sampled at the start of the $N_{avg}$ corresponding to that $\alpha$ going forward, as shown in FIG. 16.

Average BLER over $T_{eval}$ may be determined by:

$$BLER_{eval}(dB) = \left( \frac{\sum_{i=0}^{K-1} Navg(i) * BLER(i)}{\sum_{i=0}^{K-1} Navg(i)} \right),$$

where BLER(i) is the BLER associated with SNR(i) at the end of the $i^{th}$ $N_{avg}$ duration $N_{avg}(i)$ as obtained from the LUT and K is the total number of BLER estimates accumulated.

Figure 17:
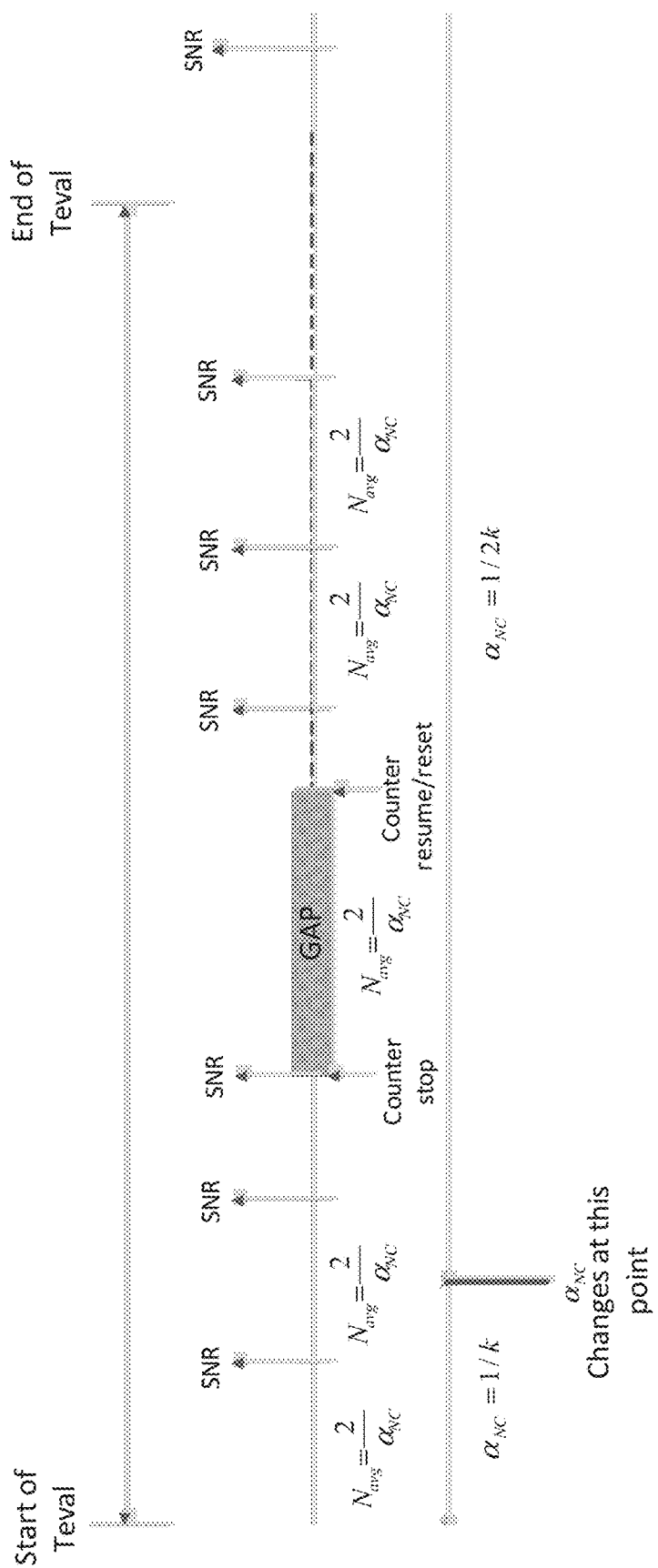
FIG. 17 is an example timeline of an SNR evaluation period with downlink gap within the SNR evaluation period, in accordance with certain aspects of the present disclosure.
Figure 18:
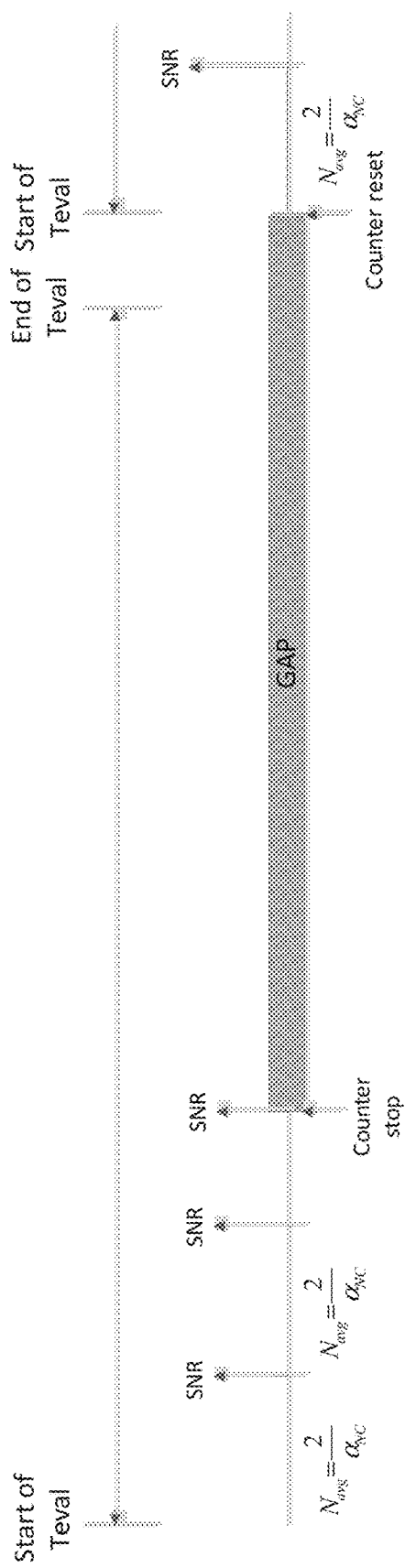
FIG. 18 is an example timeline of an SNR evaluation period with downlink gap extending beyond the SNR evaluation period, in accordance with certain aspects of the present disclosure.

If the evaluation period is shorter than the averaging length ($T_{eval} < N_{avg}$), the SNR may be reported at end of the $T_{eval}$ duration, i.e., as soon as the evaluation timer expires. If the downlink gap length is shorter than the evaluation period (as shown in FIG. 17), then at any time if the downlink gap starts due to an invalid subframe, due to gap between NPDCCH and NPDSCH, due to a CDRX (continuous DRX) gap, or uplink transmission gap, the last SNR may be reported just before the gap starts, for example, to ensure that at least one SNR estimate is reported for the evaluation time. The averaging counter $N_{avg}$ may be reset after the gap and new $N_{avg}$ may be selected based on the SNR estimate reported at the beginning of the gap. If the gap starts within the evaluation period but ends after the end of the evaluation period, as shown in FIG. 18, then at the end of $T_{eval}$, overlapping with the gap, a new $T_{eval}$ may start after the gap and the averaging counter $N_{avg}$ may be reset, and the SNR estimate from the first sample after the gap may be reported. At the start of the gap an NPDCCH deconfiguration message and asynchronous indication may be sent. After the gap ends, an NPCCH configuration may be sent.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "identifying" encompasses a wide variety of actions. For example, "identifying" may include calculating, computing, processing, deriving, investigating, looking up (e.g., looking up in a table, a database or another data structure), ascertaining and the like. Also, "identifying" may include receiving (e.g., receiving information), accessing (e.g., accessing data in a memory) and the like. Also, "identifying" may include resolving, selecting, choosing, establishing and the like.

In some cases, rather than actually communicating a frame, a device may have an interface to communicate a frame for transmission or reception. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in Figures, those operations may be performed by any suitable corresponding counterpart means-plus-function components.

For example, means for determining, means for performing, means for transmitting, means for receiving, means for sending, and/or means for measuring may include one or more processors or other elements, such as the transmit processor 264, the controller/processor 280, the receive processor 258, and/or antenna(s) 252 of the user equipment 120 illustrated in FIG. 2, and/or the transmit processor 220, the controller/processor 240, and/or antenna(s) 234 of the base station 110 illustrated in FIG. 2.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as electronic hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof. A software/firmware module may reside in RAM memory, flash memory, ROM memory, EPROM memory. EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a user equipment (UE), comprising:
   receiving a first configuration of parameters for receiving downlink control channel signaling, the first configuration of parameters associated with a first coverage level;
   measuring at least one parameter related to channel conditions;
   determining first, second, and at least third or fourth radio link monitoring (RLM) threshold values for the at least one parameter based, at least in part, on the first configuration of parameters and the first coverage level; and
   performing RLM functions based on the first, second, and at least third or fourth RLM threshold values.

2. The method of claim 1, wherein:
   the first RLM threshold value comprises a first quality threshold value of the at least one parameter related to channel conditions, below which the UE is considered to be in an out of synchronization (OOS) state; and
   the second RLM threshold value comprises a second quality threshold value of the at least one parameter related to channel conditions, above which the UE is considered to be in a synchronized state.

3. The method of claim 2, wherein:
   the third RLM threshold values comprises a third quality threshold value; and
   performing the RLM functions comprises sending an indication of a change in a coverage zone if the measured at least one parameter related to channel conditions falls below the third quality threshold value but before the measured at least one parameter related to channel conditions falls below the first quality threshold value.

4. The method of claim 3, wherein determining the third quality threshold value comprises receiving an indication of the third quality threshold value.

5. The method of claim 3, wherein:
   determining the third quality threshold value comprises selecting the third quality threshold value based on a target block error rate (BLER); and
   the target BLER is based on the measured at least one parameter related to channel conditions.

6. The method of claim 3, wherein sending the indication of the change in coverage zone comprises sending an explicit indication of the change in coverage zone or sending an indication of the at least one measured parameter indicating the change in coverage zone.

7. The method of claim 3, further comprising:
   receiving, in response to sending the indication, a second configuration of parameters for receiving downlink control channel signaling, the second configuration of parameters associated with a second coverage level.

8. The method of claim 2, wherein:
   the fourth RLM threshold values comprises a fourth quality threshold value; and
   performing the RLM functions comprises sending an indication of a change in a coverage zone if the measured at least one parameter related to channel conditions exceeds the fourth quality threshold value but before the measured at least one parameter related to channel conditions exceeds the second quality threshold value.

9. The method of claim 8, wherein determining the fourth quality threshold value comprises receiving an indication of the fourth quality threshold value.

10. The method of claim 8, wherein:
    determining the fourth quality threshold value comprises selecting the fourth quality threshold value based on a target block error rate (BLER); and
    the target BLER is based on the measured at least one parameter related to channel conditions.

11. The method of claim 8, wherein sending the indication of the change in coverage zone comprises sending an explicit indication of the change in coverage zone or sending an indication of the at least one measured parameter indicating the change in coverage zone.

12. The method of claim 8, further comprising:
    receiving, in response to sending the indication, a third configuration of parameters for receiving downlink control channel signaling, the third configuration of parameters associated with a third coverage level.

13. The method of claim 1, wherein the first configuration of parameters comprises at least one of: an aggregation level, a repetition level, a transmission mode, or a number of physical resource blocks (PRBs) in a PRB resource set.

14. The method of claim 1, wherein the at least one parameter related to channel conditions comprises at least one of: a channel impulse response, a delay spread, UE speed, a Doppler value, a number of receive antennas at the UE, a number of transmit antennas at the BS, a rank of a channel between the UE and the BS, reference signal received power (RSRP), reference signal received quality (RSRQ), signal to interference plus noise ratio (SINR), measurement accuracy due to a discontinuous reception (DRX) cycle length or enhanced DRX cycle length, a duty cycle, a deployment mode of a cell, or whether a half-duplex frequency division duplexing (FDD) or time division duplexing (TDD) mode of communication is configured.

15. A method for wireless communications by a user equipment (UE), comprising:
    receiving a first configuration of parameters for receiving downlink control channel signaling, the first configuration of parameters associated with a first coverage level;
    measuring at least one parameter related to channel conditions;
    storing sets of lookup tables (LUTs), wherein each set of LUTs is associated with a different configuration of parameters for receiving downlink control channel signaling and a different coverage level, wherein:
      each set of LUTs includes one or more subsets of LUTs; and
      each subset of LUTs is associated with one of the measured at least one parameter related to channel conditions;
    determining one or more dynamic radio link monitoring (RLM) threshold values for the at least one parameter based, at least in part, on the first configuration of parameters and based on at least one of the LUTs; and
    performing RLM functions based on the one or more dynamic RLM threshold values.

16. The method of claim 15, wherein each LUT comprises a mapping of RLM threshold values to corresponding pairs of measured parameters related to channel conditions.

17. The method of claim 15, further comprising:
    applying a correction value to the one or more dynamic RLM threshold values based on at least one of the LUTs.

18. The method of claim 15, further comprising:
    reporting a number of repetitions of the control channel used by the UE to successfully decode the control channel; or reporting a difference between the number of repetitions of the control channel used by the UE to successfully decode the control channel and a number of repetitions configured for the control channel.

19. A method for wireless communications by a user equipment (UE), comprising:
receiving a first configuration of parameters for receiving downlink control channel signaling, the first configuration of parameters associated with a first coverage level;
measuring at least one parameter related to channel conditions, wherein the at least one parameter comprises a signal-to-noise ratio (SNR);
mapping the SNR to a corresponding block error rate (BLER);
determining one or more dynamic radio link monitoring (RLM) threshold values for the at least one parameter based, at least in part, on the first configuration of parameters;
comparing the BLER to the one or more dynamic RLM threshold values; and
performing RLM functions based on the one or more dynamic RLM threshold values and based on the comparison.

20. The method of claim 19, wherein the mapping is based on a lookup table (LUT).

21. The method of claim 19, wherein the SNR comprises an average value based on a dynamically selected filter coefficient.

22. A method for wireless communications by a base station (BS), comprising:
sending a first configuration of parameters to a user equipment (UE) for receiving downlink control channel signaling, the first configuration of parameters associated with a first coverage level and first, second, third, and fourth radio link monitoring (RLM) threshold values;
receiving an indication, from the UE, of a change in a coverage zone; and
sending, in response to receiving the indication, a second configuration of parameters to the UE for receiving downlink control channel signaling, the second configuration of parameters associated with a second coverage level.

23. The method of claim 22, wherein the indication is received before receiving an indication from the UE that the UE is in an out of synchronization (00S) state or that the UE is in a synchronized state.

24. The method of claim 23, wherein receiving the indication of the change in coverage zone comprises receiving an explicit indication of the change in coverage zone or receiving an indication of the at least one measured parameter indicating the change in coverage zone.

25. The method of claim 22, wherein the first configuration of parameters comprises at least one of: an aggregation level, a repetition level, a transmission mode, or a number of physical resource blocks (PRBs) in a PRB resource set.

26. An apparatus for wireless communications by a user equipment (UE), comprising:
means for receiving a first configuration of parameters for receiving downlink control channel signaling, the first configuration of parameters associated with a first coverage level;
means for measuring at least one parameter related to channel conditions;
means for determining first, second, and at least third or fourth radio link monitoring (RLM) threshold values for the at least one parameter based, at least in part, on the first configuration of parameters and the first coverage level; and
means for performing RLM functions based on the first, second, and at least third or fourth RLM threshold values.

27. The apparatus of claim 26, wherein:
the first RLM threshold value comprises a first quality threshold value of the at least one parameter related to channel conditions, below which the UE is considered to be in an out of synchronization (OOS) state; and
the second RLM threshold value comprises a second quality threshold value of the at least one parameter related to channel conditions, above which the UE is considered to be in a synchronized state.

28. The apparatus of claim 27, wherein:
the third RLM threshold values comprises a third quality threshold value; and
performing the RLM functions comprises sending an indication of a change in a coverage zone if the measured at least one parameter related to channel conditions falls below the third quality threshold value but before the measured at least one parameter related to channel conditions falls below the first quality threshold value.

29. The apparatus of claim 28, wherein means for determining the third quality threshold value comprises means for receiving an indication of the third quality threshold value.

30. The apparatus of claim 28, wherein:
means for determining the third quality threshold value comprises means for selecting the third quality threshold value based on a target block error rate (BLER); and
the target BLER is based on the measured at least one parameter related to channel conditions.

31. The apparatus of claim 28, wherein means for sending the indication of the change in coverage zone comprises means for sending an explicit indication of the change in coverage zone or means for sending an indication of the at least one measured parameter indicating the change in coverage zone.

32. The apparatus of claim 28, further comprising:
means for receiving, in response to sending the indication, a second configuration of parameters for receiving downlink control channel signaling, the second configuration of parameters associated with a second coverage level.

33. The apparatus of claim 27, wherein:
the fourth RLM threshold values comprises a fourth quality threshold value; and
performing the RLM functions comprises sending an indication of a change in a coverage zone if the measured at least one parameter related to channel conditions exceeds the fourth quality threshold value but before the measured at least one parameter related to channel conditions exceeds the second quality threshold value.

34. The apparatus of claim 33, wherein means for determining the fourth quality threshold value comprises means for receiving an indication of the fourth quality threshold value.

35. The apparatus of claim 33, wherein:
means for determining the fourth quality threshold value comprises means for selecting the fourth quality threshold value based on a target block error rate (BLER); and the target BLER is based on the measured at least one parameter related to channel condition.

36. The apparatus of claim 33, wherein means for sending the indication of the change in coverage zone comprises means for sending an explicit indication of the change in coverage zone or means for sending an indication of the at least one measured parameter indicating the change in coverage zone.

37. The apparatus of claim 33, further comprising:
means for receiving, in response to sending the indication, a third configuration of parameters for receiving downlink control channel signaling, the third configuration of parameters associated with a third coverage level.

38. The apparatus of claim 26, wherein the first configuration of parameters comprises at least one of: an aggregation level, a repetition level, a transmission mode, or a number of physical resource blocks (PRBs) in a PRB resource set.

39. The apparatus of claim 26, wherein the at least one parameter related to channel conditions comprises at least one of: a channel impulse response, a delay spread, UE speed, a Doppler value, a number of receive antennas at the UE, a number of transmit antennas at the BS, a rank of a channel between the UE and the BS, reference signal received power (RSRP), reference signal received quality (RSRQ), signal to interference plus noise ratio (SINR), measurement accuracy due to a discontinuous reception (DRX) cycle length or enhanced DRX cycle length, a duty cycle, a deployment mode of a cell, or whether a half-duplex frequency division duplexing (FDD) or time division duplexing (TDD) mode of communication is configured.

40. An apparatus for wireless communications by a user equipment (UE), comprising:
means for receiving a first configuration of parameters for receiving downlink control channel signaling, the first configuration of parameters associated with a first coverage level;
means for measuring at least one parameter related to channel conditions;
means for storing sets of lookup tables (LUTs), wherein each set of LUTs is associated with a different configuration of parameters for receiving downlink control channel signaling and a different coverage level, wherein:
each set of LUTs includes one or more subsets of LUTs; and
each subset of LUTs is associated with one of the measured at least one parameters related to channel conditions;
means for determining one or more dynamic radio link monitoring (RLM) threshold values for the at least one parameter based, at least in part, on the first configuration of parameters and based on at least one of the LUTs; and
means for performing RLM functions based on the one or more dynamic RLM threshold values.

41. The apparatus of claim 40, wherein each LUT comprises a mapping of RLM threshold values to corresponding pairs of measured parameters related to channel conditions.

42. The apparatus of claim 40, further comprising:
means for applying a correction value to the one or more dynamic RLM threshold values based on at least one of the LUTs.

43. The apparatus of claim 40, further comprising:
means for reporting a number of repetitions of the control channel used by the UE to successfully decode the control channel; or
means for reporting a difference between the number of repetitions of the control channel used by the UE to successfully decode the control channel and a number of repetitions configured for the control channel.

44. An apparatus for wireless communications by a user equipment (UE), comprising:
means for receiving a first configuration of parameters for receiving downlink control channel signaling, the first configuration of parameters associated with a first coverage level;
measuring at least one parameter related to channel conditions, wherein the at least one parameter comprises a signal-to-noise ratio (SNR);
means for mapping the SNR to a corresponding block error rate (BLER);
means for determining one or more dynamic radio link monitoring (RLM) threshold values for the at least one parameter based, at least in part, on the first configuration of parameters and the first coverage level;
means for comparing the BLER to the one or more dynamic RLM threshold values; and
means for performing RLM functions based on the one or more dynamic RLM threshold values and based on the comparison.

45. The apparatus of claim 44, wherein the mapping is based on a lookup table (LUT).

46. The apparatus of claim 44, wherein the SNR comprises an average value based on a dynamically selected filter coefficient.

47. An apparatus for wireless communications by a base station (BS), comprising:
means for sending a first configuration of parameters to a user equipment (UE) for receiving downlink control channel signaling, the first configuration of parameters associated with a first coverage level and first, second, third, and fourth radio link monitoring (RLM) threshold values;
means for receiving an indication, from the UE, of a change in a coverage zone; and
means for sending, in response to receiving the indication, a second configuration of parameters to the UE for receiving downlink control channel signaling, the second configuration of parameters associated with a second coverage level.

48. The apparatus of claim 47, wherein the indication is received before receiving an indication from the UE that the UE is in an out of synchronization (OOS) state or that the UE is in a synchronized state.

49. The apparatus of claim 47, wherein the first configuration of parameters comprises at least one of: an aggregation level, a repetition level, a transmission mode, or a number of physical resource blocks (PRBs) in a PRB resource set.

50. The apparatus of claim 47, wherein means for receiving the indication of the change in coverage zone comprises means for receiving an explicit indication of the change in coverage zone or means for receiving an indication of the at least one measured parameter indicating the change in coverage zone.

* * * * *